(12) United States Patent
Uekusa

(10) Patent No.: US 12,041,352 B2
(45) Date of Patent: Jul. 16, 2024

(54) IMAGE PICKUP CONTROL DEVICE, IMAGE PICKUP DEVICE, CONTROL METHOD FOR IMAGE PICKUP DEVICE, NON-TRANSITORY COMPUTER-READABLE STORAGE MEDIUM

(71) Applicant: CANON KABUSHIKI KAISHA, Tokyo (JP)

(72) Inventor: Tomotaka Uekusa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/067,610

(22) Filed: Dec. 16, 2022

(65) Prior Publication Data

US 2023/0121972 A1  Apr. 20, 2023

Related U.S. Application Data

(63) Continuation of application No. 17/318,835, filed on May 12, 2021, now Pat. No. 11,553,128.

(30) Foreign Application Priority Data

May 15, 2020  (JP) .................. 2020-085890

(51) Int. Cl.
*H04N 23/67*  (2023.01)
*H04N 23/63*  (2023.01)
*H04N 23/667*  (2023.01)

(52) U.S. Cl.
CPC ......... *H04N 23/675* (2023.01); *H04N 23/635* (2023.01); *H04N 23/667* (2023.01)

(58) Field of Classification Search
CPC ....... H04N 5/232127; H04N 5/232945; H04N 5/23245; H04N 23/672; H04N 23/63;
(Continued)

(56) References Cited

U.S. PATENT DOCUMENTS 6,191,819 B1 *  2/2001  Nakano ................ H04N 23/635
                                                    348/333.03
8,520,115 B2 *  8/2013  Urakawa .............. H04N 23/634
                                                    348/333.03
(Continued)

FOREIGN PATENT DOCUMENTS

JP  H08046852 A  2/1996
JP  2013131996 A  7/2013
(Continued)

*Primary Examiner* — Pritham D Prabhakher
(74) *Attorney, Agent, or Firm* — Canon U.S.A., Inc. I.P. Division

(57) ABSTRACT

An image pickup control device, comprising: a first obtainment unit configured to obtain a picked-up image picked up by an image pickup unit; a display control unit configured to display the picked-up image on a display; a detection unit configured to detect a viewpoint region which is a region viewed by a user in the display; a second obtainment unit configured to obtain a feature amount relating to the picked-up image; and a control unit configured to switch between a first mode, in which a focus of the image pickup unit is controlled such that a subject displayed on the viewpoint region is focused, and a second mode, in which control is executed such that the focus is not changed, on a basis of the viewpoint region and the feature amount.

14 Claims, 19 Drawing Sheets

(58) Field of Classification Search
CPC .. H04N 23/635; H04N 23/667; H04N 23/675; H04N 23/53
USPC .................................................. 348/333.11
See application file for complete search history.

(56) References Cited

U.S. PATENT DOCUMENTS

| | | | | |
|---|---|---|---|---|
| 8,945,197 | B1* | 2/2015 | Friend | A61N 5/06 |
| | | | | 607/88 |
| 9,066,010 | B2* | 6/2015 | Tomizawa | H04N 23/80 |
| 9,094,599 | B2* | 7/2015 | Koh | H04N 23/62 |
| 10,061,983 | B2* | 8/2018 | Yoneyama | G06T 7/90 |
| 10,382,672 | B2* | 8/2019 | Moon | H04N 23/64 |
| 10,664,991 | B2* | 5/2020 | Sugimoto | G06F 3/04842 |
| 2008/0080739 | A1* | 4/2008 | Muramatsu | G03B 35/18 |
| | | | | 382/103 |
| 2010/0123782 | A1* | 5/2010 | Yata | H04N 23/635 |
| | | | | 348/169 |
| 2010/0182479 | A1* | 7/2010 | Urakawa | H04N 23/61 |
| | | | | 348/E5.022 |
| 2012/0140036 | A1* | 6/2012 | Maruyama | H04N 19/146 |
| | | | | 348/43 |
| 2013/0155309 | A1* | 6/2013 | Hill | H04N 23/635 |
| | | | | 348/E5.045 |
| 2013/0162839 | A1* | 6/2013 | Yoneyama | H04N 23/673 |
| | | | | 348/169 |
| 2013/0258167 | A1* | 10/2013 | Gum | H04N 23/675 |
| | | | | 348/E5.045 |
| 2013/0300917 | A1* | 11/2013 | Yata | G02B 7/38 |
| | | | | 348/349 |
| 2014/0071313 | A1* | 3/2014 | Hiasa | H04N 5/21 |
| | | | | 348/231.99 |
| 2014/0198230 | A1* | 7/2014 | Tsutsumi | H04N 23/673 |
| | | | | 348/218.1 |
| 2014/0267803 | A1* | 9/2014 | Shintani | H04N 23/61 |
| | | | | 348/222.1 |
| 2015/0097982 | A1* | 4/2015 | Tomizawa | H04N 23/80 |
| | | | | 348/222.1 |
| 2015/0194128 | A1* | 7/2015 | Hicok | G09G 5/12 |
| | | | | 345/592 |
| 2015/0271387 | A1* | 9/2015 | Koh | H04N 23/695 |
| | | | | 348/335 |
| 2016/0110604 | A1* | 4/2016 | Yoneyama | H04N 23/675 |
| | | | | 382/103 |
| 2016/0296106 | A1* | 10/2016 | Shoji | H04N 23/56 |
| 2016/0344934 | A1* | 11/2016 | Kato | H04N 23/63 |
| 2017/0019589 | A1* | 1/2017 | Moon | H04N 5/145 |
| 2017/0026565 | A1* | 1/2017 | Hong | G06V 40/161 |
| 2017/0339348 | A1* | 11/2017 | Shimizu | H04N 23/635 |
| 2018/0053284 | A1* | 2/2018 | Rodriguez | G06F 1/3243 |
| 2018/0232894 | A1* | 8/2018 | Kim | G01S 3/00 |
| 2018/0348470 | A1* | 12/2018 | Suzuki | H04N 23/675 |
| 2019/0020826 | A1* | 1/2019 | Takehara | H04N 25/674 |
| 2019/0200084 | A1* | 6/2019 | Gilson | H04N 21/4728 |
| 2019/0369402 | A1* | 12/2019 | Woodman | H04N 23/57 |
| 2019/0394488 | A1* | 12/2019 | Alpaslan | H04N 19/597 |
| 2020/0045225 | A1* | 2/2020 | Jaiswal | H04N 23/633 |
| 2020/0259983 | A1* | 8/2020 | Aoki | H04N 23/6811 |
| 2020/0314434 | A1* | 10/2020 | Li | H04N 19/196 |

FOREIGN PATENT DOCUMENTS

| | | |
|---|---|---|
| JP | 2017085340 A | 5/2017 |
| JP | 2019129461 A | 8/2019 |

* cited by examiner

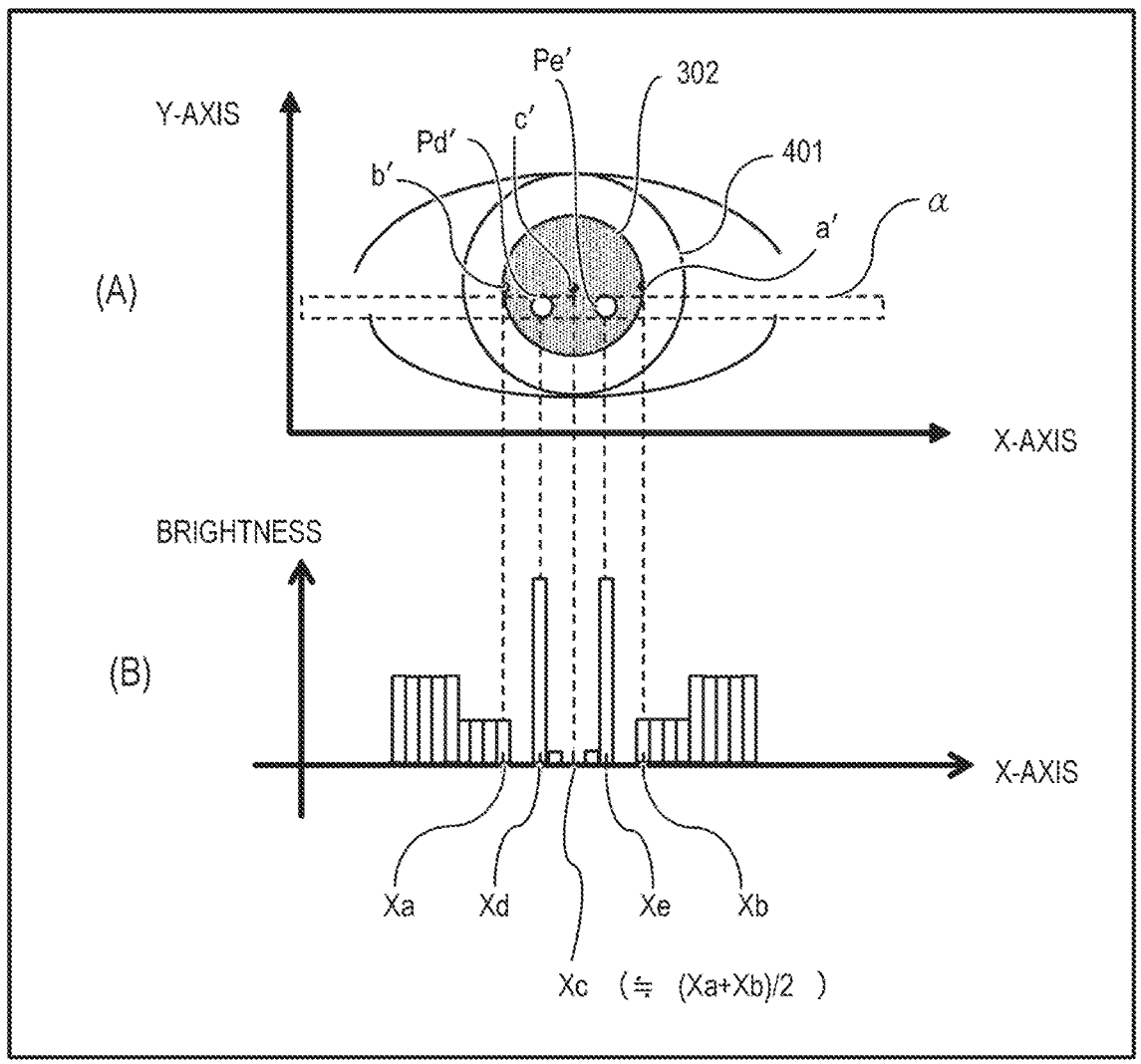

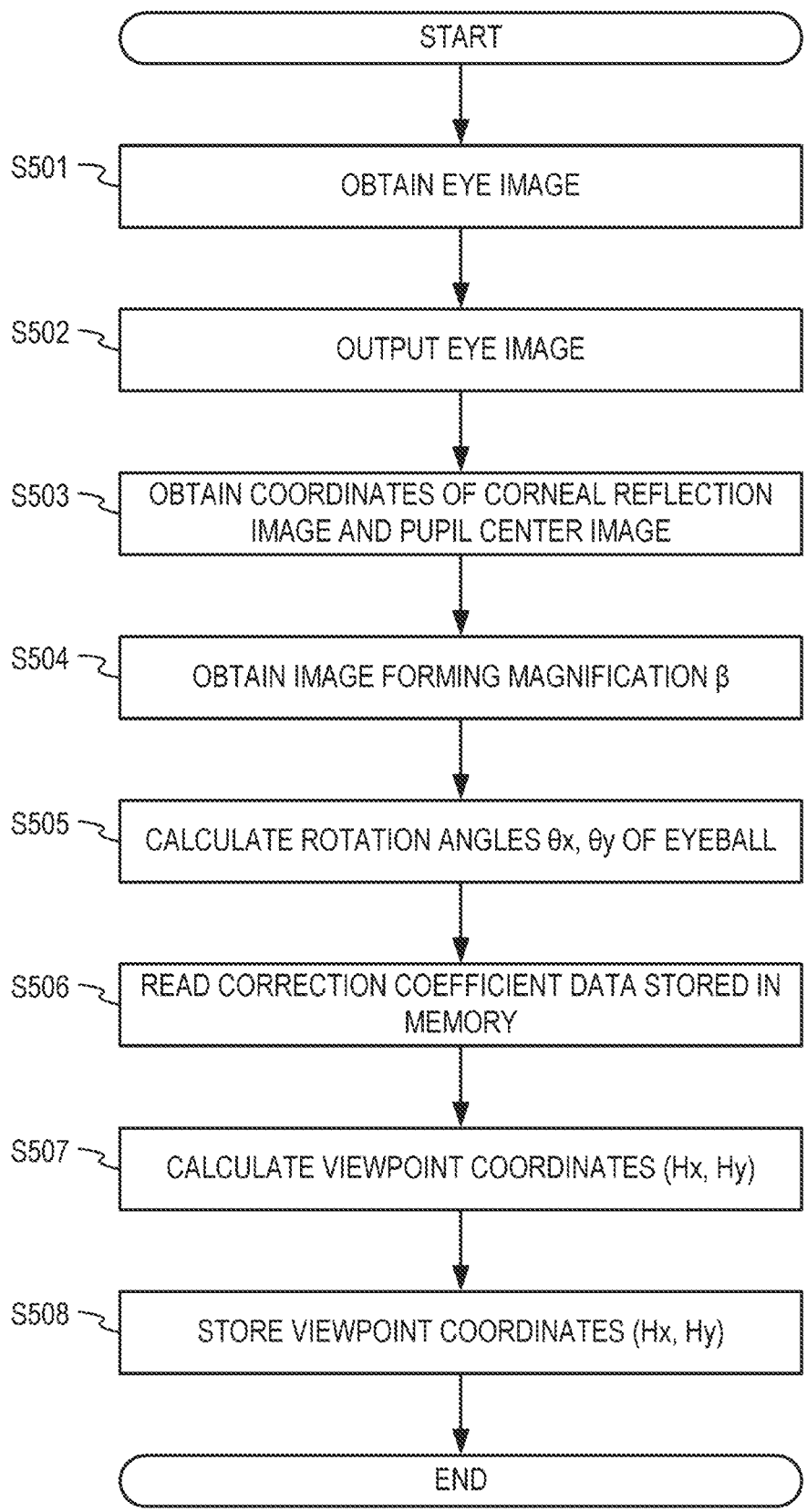

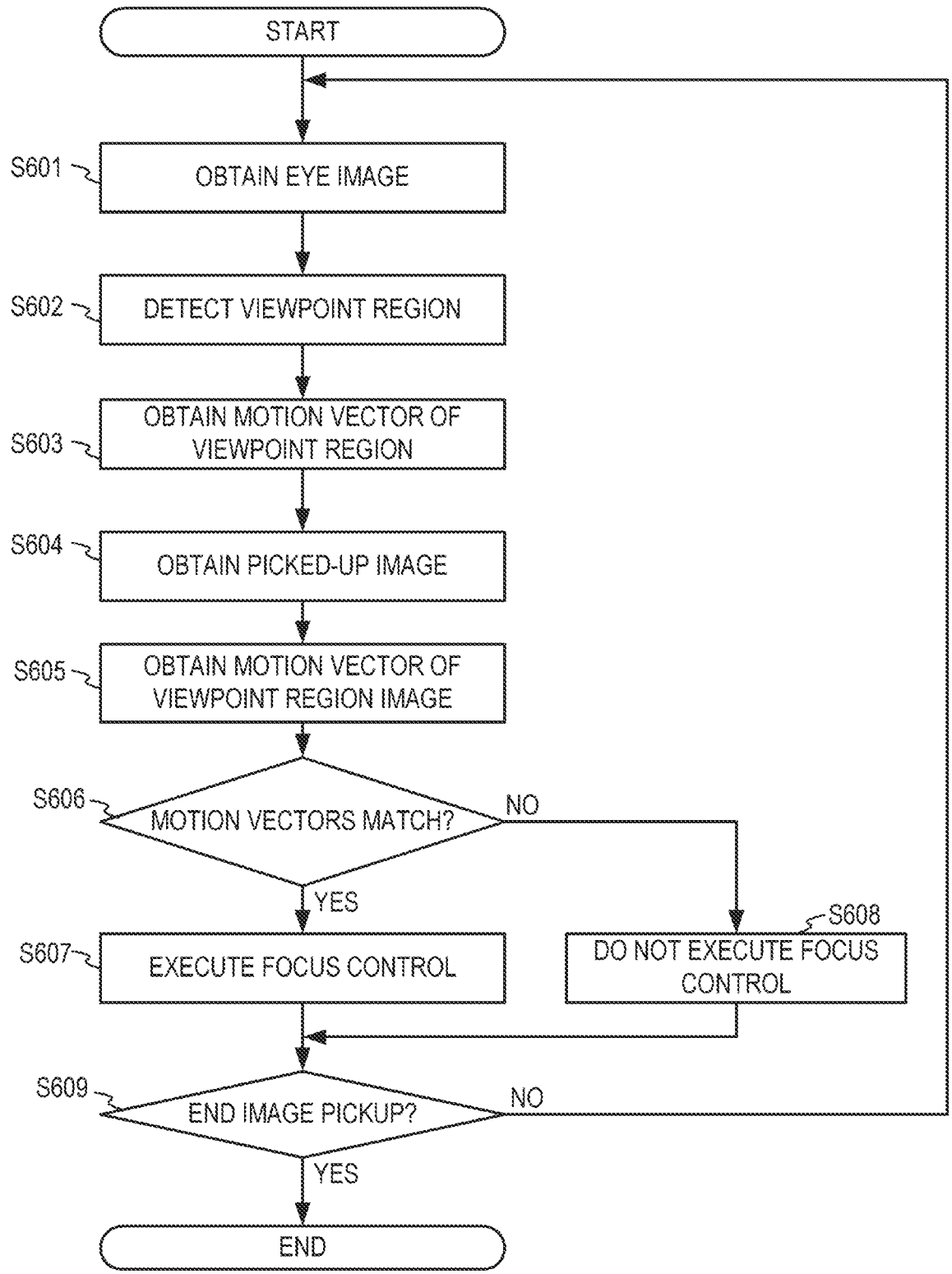

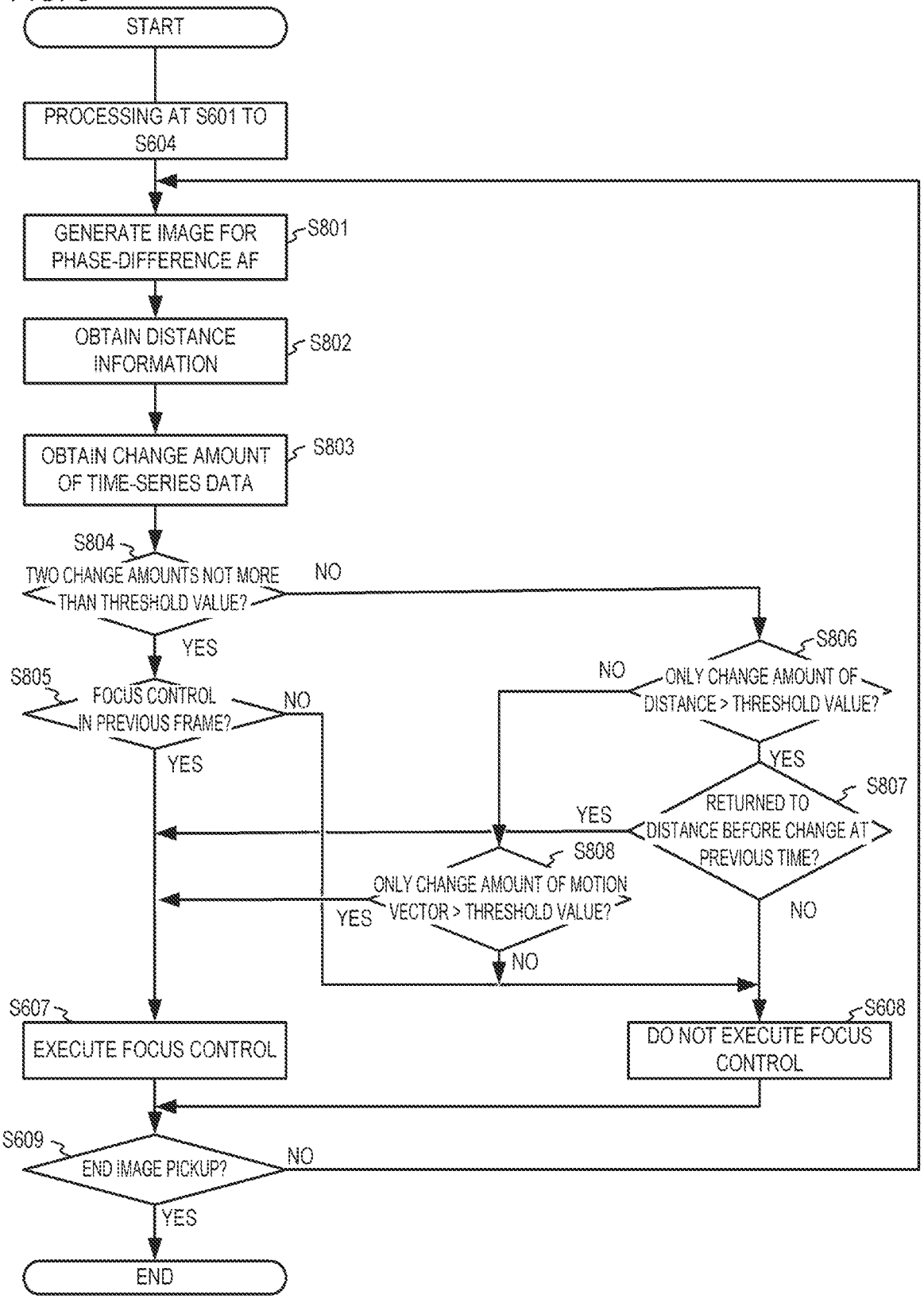

IMAGE PICKUP CONTROL DEVICE, IMAGE PICKUP DEVICE, CONTROL METHOD FOR IMAGE PICKUP DEVICE, NON-TRANSITORY COMPUTER-READABLE STORAGE MEDIUM

CROSS-REFERENCE TO RELATED APPLICATIONS

This application is a Continuation of co-pending U.S. patent application Ser. No. 17/318,835 filed May 12, 2021, which claims the benefit of Japanese Application No. 2020-085890 filed May 15, 2020. The disclosures of the above-identified applications are hereby incorporated by reference herein in their entireties.

BACKGROUND OF THE INVENTION

Field of the Invention

The present invention relates to an image pickup control device and particularly relates to focus control.

Description of the Related Art

In recent years, trends to automation/intelligent features have advanced for a camera. Japanese Patent Application Publication No 2004-8323 discloses an image pickup device which detects a line-of-sight of a user looking into a finder without the user's input of a position of a subject and executes focus control (focusing) on a subject intended by the user on the basis of the detected line-of-sight.

Moreover, Japanese Patent Application Publication No. 2017-34569 discloses technology of setting to a continuous AF (autofocus) mode in which a subject is continuously focused when a trajectory of a user's viewpoint (viewed position) matches a trajectory of the subject in a displayed moving image.

However, in the aforementioned technology, if an obstacle overlaps with the subject intended by the user during photographing of a moving image, the obstacle is focused, and an unnecessary focus change occurs, which deteriorates a quality of the moving image. On the other hand, during photographing of a still image, when the subject intended by the user appears again after overlapping by an obstacle, it takes a long time for the focus control on the subject, and a photographing chance may be lost.

Furthermore, in order to cope with loss of the subject or entering of the obstacle, it is conceivable to set time appropriately until the AF is executed since the detection of the line-of-sight (AF response), but the AF response cannot be changed dynamically. Therefore, both maintaining of AF follow-up to the same subject intended by the user and AF follow-up characteristics at switching of the subject which is an AF target cannot be realized at the same time.

That is, it has not been possible to continuously focus on the subject intended by the user by a line-of-sight input.

SUMMARY OF THE INVENTION

Thus, an object of the present invention is to provide technology of continuously focusing on a subject intended by a user by a line-of-sight input.

A first aspect of the present invention is: an image pickup control device, comprising: at least one memory and at least one processor which function as: a first obtainment unit configured to obtain a picked-up image picked up by an image pickup unit; a display control unit configured to display the picked-up image on a display; a detection unit configured to detect a viewpoint region which is a region viewed by a user in the display; a second obtainment unit configured to obtain a feature amount relating to the picked-up image; and a control unit configured to switch between a first mode, in which a focus of the image pickup unit is controlled such that a subject displayed on the viewpoint region is focused, and a second mode, in which control is executed such that the focus is not changed, on a basis of the viewpoint region and the feature amount.

A second aspect of the present invention is: a control method for an image pickup device having an image pickup unit that obtains a picked-up image and a display that displays the picked-up image, the method comprising: detecting a viewpoint region which is a region viewed by a user on the display; obtaining a feature amount relating to the picked-up image; and controlling to switch between a first mode, in which a focus of the image pickup unit is controlled such that a subject displayed in the viewpoint region is focused, and a second mode, in which control is executed such that the focus is not changed, on a basis of the viewpoint region and the feature amount.

Further features of the present invention will become apparent from the following description of exemplary embodiments with reference to the attached drawings.

BRIEF DESCRIPTION OF THE DRAWINGS

FIG. 4 is a view for explaining a line-of-sight detection method according to the embodiment 1.

FIG. 5 is a flowchart of line-of-sight detection processing according to the embodiment 1.

FIG. 6 is a flowchart of focus control processing according to the embodiment 1.

FIG. 8 is a flowchart of the focus control processing according to an embodiment 2.

DESCRIPTION OF THE EMBODIMENTS

Hereinafter, embodiments of the present invention will be described by referring to the attached drawings.

Embodiment 1

Figure 1:
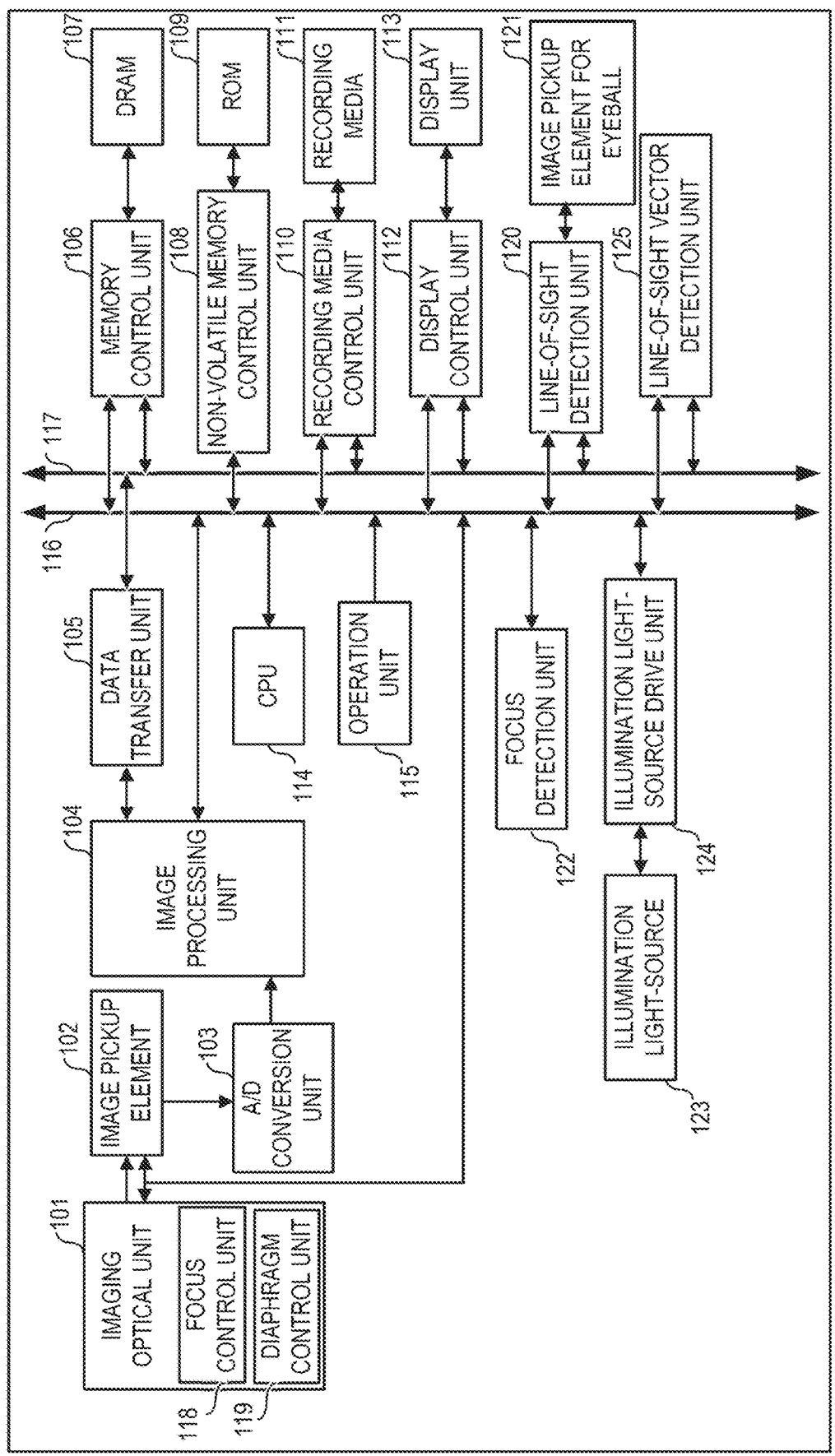
FIG. 1 is a configuration diagram of a digital camera according to an embodiment 1.

(Configuration of Digital Camera): Configuration of a digital camera 100 which is an image pickup device (electronic device) according to an embodiment 1 will be described by referring to FIG. 1. FIG. 1 is a configuration diagram illustrating major function units of the digital camera 100. The digital camera 100 has an imaging optical unit 101, an image pickup element 102, an A/D conversion unit 103, an image processing unit 104, and a data transfer unit 105. The digital camera 100 has a memory control unit 106, a DRAM 107, a non-volatile memory control unit 108, a ROM 109, a recording media control unit 110, a recording media 111, a display control unit 112, a display unit 113, a CPU 114, and an operation unit 115. The digital camera 100 has a line-of-sight detection unit 120, an image pickup element 121 for eyeball, a focus detection unit 122, an illumination light source 123, an illumination light-source drive unit 124, and a line-of-sight vector detection unit 125.

The imaging optical unit 101 forms an optical image on the image pickup element 102. The imaging optical unit 101 has a plurality of lens groups including a focus lens and an anti-vibration lens and a diaphragm. Moreover, the imaging optical unit 101 has a focus control unit 118 that executes focus control and a diaphragm control unit 119 that executes exposure adjustment, camera-shake correction and the like.

The image pickup element 102 picks up an image of a subject by executing photoelectric conversion for converting an optical image to an electric signal (analog image signal). The image pickup element 102 includes a CCD, a CMOS sensor and the like. Moreover, the image pickup element 102 includes a plurality of independent photodiodes in an exclusive pixel or each pixel for executing image-plane phase difference AF (phase difference AF executed on an image-plane (image pickup plane, sensor plane)).

The A/D conversion unit 103 converts the analog image signal obtained from the image pickup element 102 to a digital image signal (image data; image). The image after the conversion (image data) is output to the image processing unit 104.

The image processing unit 104 executes processing such as correction of chromatic aberration of magnification, development processing, noise-reduction processing, geometric deformation, and resizing such as scaling to the image (image data; digital image signal). Moreover, the image processing unit 104 has a buffer memory. Furthermore, the image processing unit 104 has an image pickup correction unit that executes pixel correction, black-level correction, shading correction, flaw correction and the like to the image converted by the A/D conversion unit 103.

The data transfer unit 105 has a plurality of DMAC (direct memory access controller) and executes data transfer of an image processed by the image processing unit 104 and the like.

The memory control unit 106 causes the DRAM 107 to read/write the data by being controlled by the CPU 114 or the data transfer unit 105.

The DRAM 107 is a memory (storage medium) storing the data. The DRAM 107 stores data such as a predetermined number of still images, moving images for a predetermined time, sound and the like, a constant for operating the CPU 114, a program and the like. Thus, the DRAM 107 includes a sufficient storage capacity for storing such data.

The non-volatile memory control unit 108 reads/writes data from/to the ROM 109 by being controlled by the CPU 114.

The ROM 109 is an electrically erasable/recordable memory (non-volatile memory) and can be an EEPROM or the like. The ROM 109 stores constants, programs and the like used by the CPU 114.

The recording media control unit 110 reads records of images and recorded data with respect to the recording media 111. The recording media 111 is recording media such as an SD card recording the data.

The display control unit 112 controls display of the display unit 113. The display unit 113 is a liquid crystal display or an electronic viewfinder. The display unit 113 displays the image obtained from the image processing unit 104, a menu screen and the like. Moreover, the display unit 113 obtains an image of a real-time subject (live-view image: picked-up image) from the A/D conversion unit 103 and displays it by control of the display control unit 112 before the photographing of still images and during photographing of moving images.

The CPU 114 is a control unit such as a microcomputer that controls the entire digital camera 100. The CPU 114 controls each function unit. Moreover, the CPU 114 performs calculations required at control. The CPU 114 controls the image processing unit 104, the data transfer unit 105, the memory control unit 106, the non-volatile memory control unit 108, the recording media control unit 110, the display control unit 112, the operation unit 115, the image pickup element 102 and the like through a bus 116. The CPU 114 realizes each control by executing the program recorded in the ROM 109, for example. Moreover, the CPU 114 executes control of a lens and a diaphragm of the imaging optical unit 101 and obtainment of information such as a focal distance.

The operation unit 115 includes operation members such as a switch, a button, a touch panel and the like operated by a user. For example, the operation unit 115 is used for operations of ON/OFF of a power supply and ON/OFF of a shutter.

The bus 116 is a system bus for transmitting a control signal of each block mainly from the CPU 114 and the like. A bus 117 is a data bus for transferring mainly images.

The line-of-sight detection unit 120 detects a line-of-sight direction of the user on the basis of an image of an eyeball (eye image) input from the image pickup element 121 for eyeball. Details of a line-of-sight detection operation will be described later. Moreover, the line-of-sight detection unit 120 obtains a viewpoint region which is a region where the user is viewing in the display unit 113.

The image pickup element 121 for eyeball obtains the image of the eyeball (eye image) by forming an optical image of the eyeball of the user looking into the viewfinder. The image pickup element 121 for eyeball outputs the eye image to the line-of-sight detection unit 120.

The focus detection unit 122 calculates a lens driving amount for controlling the focus. The region to be focused is determined by the line-of-sight detection unit 120 and the image processing unit 104. The focus detection unit 122 drives/controls the focus lens with respect to the focus control unit 118. For the calculation of the lens driving amount, an image-plane phase difference method based on the image obtained by the image pickup element 102 (image for focus detection), for example, can be used.

The illumination light source 123 is a light source that emits infrared light to the user for line-of-sight detection. The infrared light emitted from the illumination light source 123 is emitted to the eyeball of the user, and a reflection light (reflected image) in the eyeball is formed in the image pickup element 121 for eyeball. The illumination light-source drive unit 124 is a drive unit that controls the illumination light source 123.

The line-of-sight vector detection unit 125 calculates time-series movement of the viewed position and detects it as the line-of-sight vector from the data of the line-of-sight direction of the user detected by the line-of-sight detection unit 120.

Figure 2:
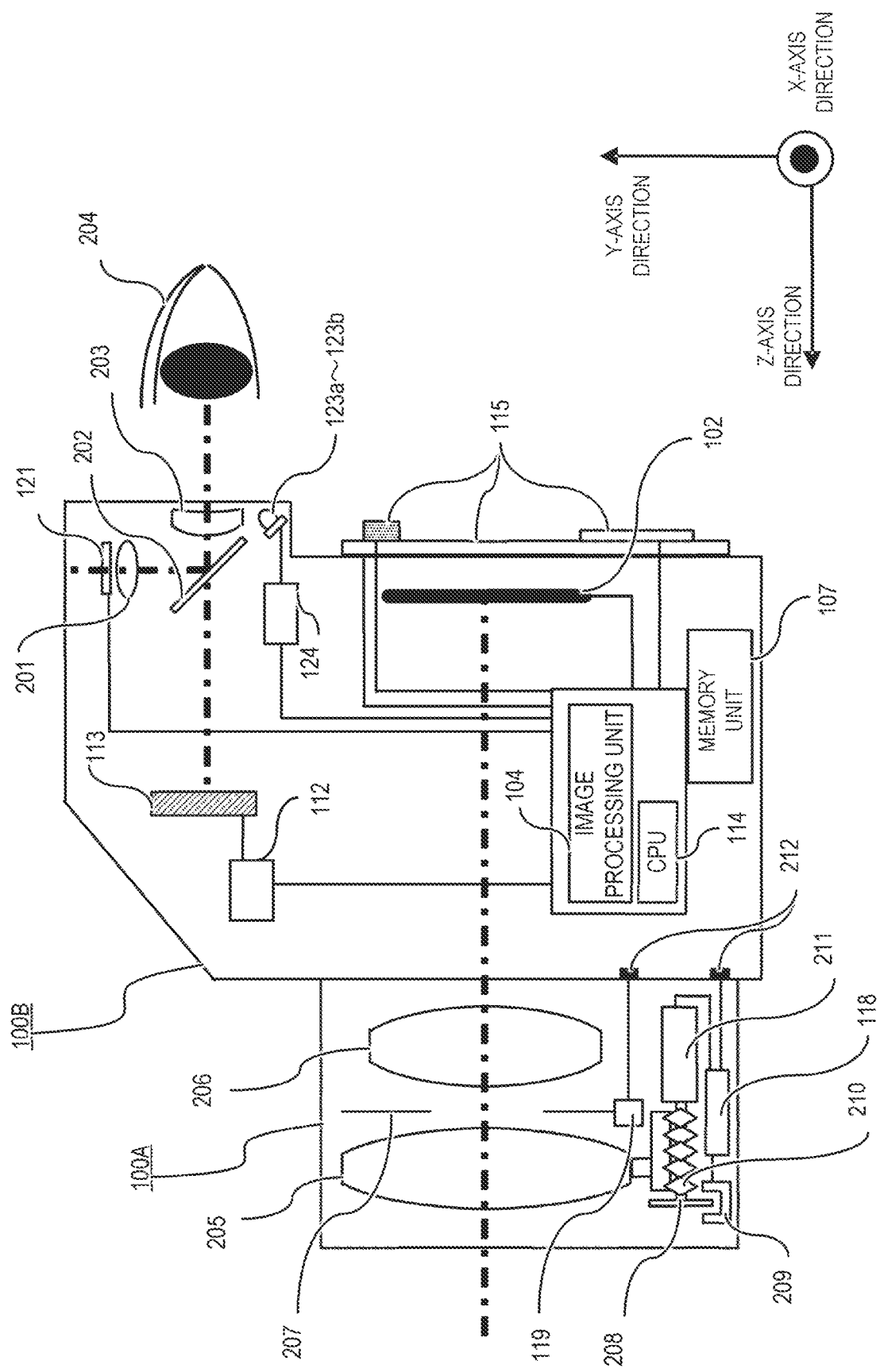
FIG. 2 is a sectional view of the digital camera according to the embodiment 1.

FIG. 2 is a sectional view (explanatory view) of a cut-off housing of the digital camera 100 according to the embodiment 1. In FIG. 2, the same portions as those in FIG. 1 are given the same numbers. As shown in FIG. 2, the digital camera 100 has members and components (hardware) other than each function unit as shown in FIG. 1.

A photographing lens 100A is a photographing lens in an interchangeable lens type camera. In FIG. 2, the photographing lens 100A is illustrated to have two lenses, that is, a focus lens 205 and a lens 206, therein, but it has more lenses.

A housing unit 100B is a housing unit of a main body of the digital camera 100. The housing unit 100B has the image pickup element 102, light sources 123a and 123b, a light receiving lens 201, and an ocular lens 203 therein.

The image pickup element 102 is arranged on an image forming surface of the photographing lens 100A. The ocular lens 203 is a lens for a user to observe a subject image displayed on the display unit 113.

The light sources 123a and 123b are light sources used for detecting the line-of-sight direction from a relationship between a reflection image by corneal reflection of the light source and a pupil and illuminates an eyeball 204 of the user. The light sources 123a and 123b have infrared-emitting diodes and are arranged around the ocular lens 203. The illuminated eyeball image and the image by the corneal reflection of the light sources 123a and 123b are transmitted through the ocular lens 203 and are reflected in a light divider 202. The reflected image is formed by the light receiving lens 201 on the image pickup element 121 for eyeball in which photoelectric element rows such as a CCD and the like are arranged two-dimensionally.

The light receiving lens 201 positions the pupil of the eyeball 204 of the user and the image pickup element 121 for eyeball in a common-benefit image forming relationship. The line-of-sight detection unit 120 detects the line-of-sight direction by using a predetermined algorithm which will be described later from the positional relationship between the eyeball whose image is formed on the image pickup element 121 for eyeball and the image by the corneal reflection of the light sources 123a and 123b.

A diaphragm 207 is a diaphragm provided on the photographing lens 100A.

The diaphragm 207 is controlled by the diaphragm control unit 119. A lens drive member 210 has a drive gear and the like. A lens drive motor 211 is a motor for moving the focus lens 205. A photocoupler 209 detects rotation of a pulse plate 208 interlocking with the lens drive member 210 and outputs information of the detected rotation to the focus control unit 118.

The focus control unit 118 drives the lens drive motor 211 on the basis of the information of rotation of the pulse plate 208 and the information of the lens drive amount and moves the focus lens 205 to a focusing position. A mount contact 212 is a well-known interface between the camera and the lens.

Moreover, in FIG. 2, the operation members such as a touch-panel compatible liquid crystal, a button-type cross key and the like are arranged as the operation unit 115.

Figure 3:
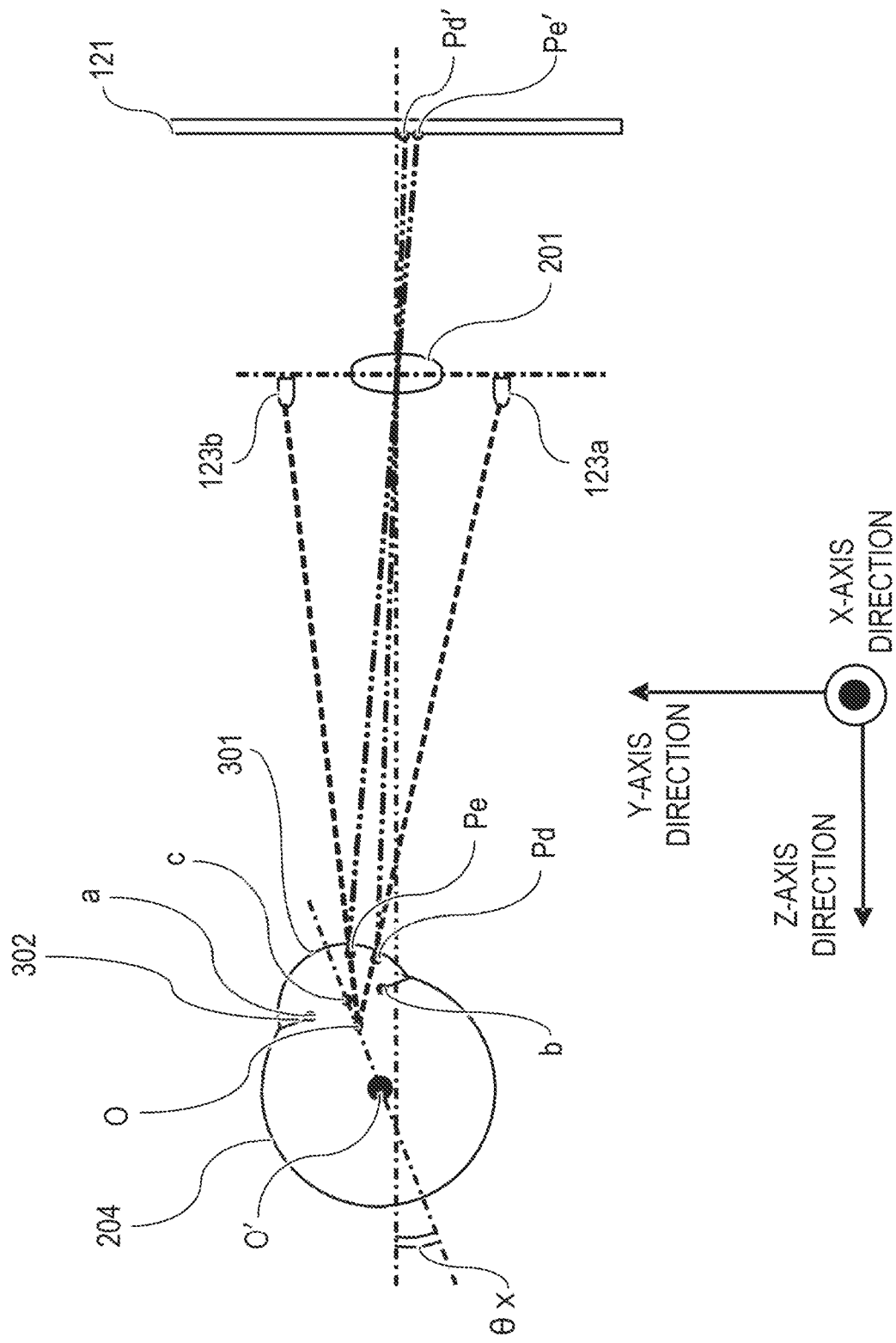
FIG. 3 is a schematic view of an optical system for executing line-of-sight detection according to the embodiment 1.

(Line-of-Sight Detection Method): Hereinafter, a line-of-sight detection method will be described by referring to FIG. 3, FIG. 4, and FIG. 5. FIG. 3 is a view for explaining a principle of the line-of-sight detection method and a schematic view of an optical system for performing the line-of-sight detection.

In FIG. 3, the light sources 123a and 123b are light sources such as light emitting diodes and emit infrared light to the user. The light sources 123a and 123b are arranged substantially symmetrically to an optical axis of the light receiving lens 201 and illuminate the eyeball 204 of the user. A part of illumination light reflected on the eyeball 204 forms an image by the light receiving lens 201 on the image pickup element 121 for eyeball. In FIG. 3, positions of the light sources 123a and 123b, the light receiving lens 201, and the image pickup element 121 for eyeball are adjusted so that the principle of the line-of-sight detection method can be understood easily.

(A) of FIG. 4 is a schematic diagram of an eyeball image (eyeball image projected to the image pickup element 121 for eyeball) picked up by the image pickup element 121 for eyeball. (B) of FIG. 4 is a diagram illustrating output intensity of the image pickup element 121 for eyeball (CCD, for example).

FIG. 5 is a flowchart illustrating line-of-sight detection processing. The flowchart in FIG. 5 is realized by the CPU 114 executing the program stored in the ROM 109 and controlling each function unit at each Step.

At Step S501, the light sources 123a and 123b are driven by the illumination light-source drive unit 124 and emit the infrared light toward the eyeball 204 of the user. The eyeball image of the user illuminated by the infrared light is formed on the image pickup element 121 for eyeball through the light receiving lens 201, and photoelectric conversion is performed by the image pickup element 121 for eyeball. By means of the photoelectric conversion, the eyeball image can be handled as an eye image (image signal; electric signal).

At Step S502, the image pickup element 121 for eyeball outputs an obtained eye image to the line-of-sight detection unit 120.

At Step S503, the line-of-sight detection unit 120 calculates coordinates of corneal reflection images Pd and Pe of the light sources 123a and 123b and a point corresponding to a pupil center c from the eye image.

Here, as illustrated in FIG. 3, the infrared light emitted from the light sources 123a and 123b illuminates a cornea 301 of the eyeball 204 of the user. At this time, the corneal reflection images Pd and Pe formed by a part of the infrared light reflected on the surface of the cornea 301 are converged by the light receiving lens 201, form an image on the image pickup element 121 for eyeball, and become corneal reflection images Pd' and Pe' in the eye image. The light from end portions a and b of the pupil 302 similarly form an image on the image pickup element 121 for eyeball and become pupil end images a' and b' in the eye image.

(A) of FIG. 4 illustrates an example of the reflection image (eye image) obtained from the image pickup element 121 for eyeball. (B) of FIG. 4 illustrates brightness information (brightness distribution) obtained from the image pickup element 121 for eyeball in an area a of the eye image illustrated in (A) of FIG. 4. In (B) of FIG. 4, assuming that a horizontal direction of the eye image is an X-axis and a vertical direction as a Y-axis, the brightness distribution in the X-axis direction is illustrated, in the present embodiment, coordinates of the corneal reflection images Pd' and Pe' in the X-axis direction (horizontal direction) are assumed to be Xd and Xe. Moreover, coordinates of the pupil end images a' and b' in the X-axis direction are assumed to be Xa and Xb.

As illustrated in (B) of FIG. 4, the brightness at an extremely high level can be obtained at the coordinates Xd and Xe of the corneal reflection images Pd' and Pe'. In the area of the pupil 302 (an area between the coordinates Xa to Xb), the brightness at an extremely low level is obtained except the positions at the coordinates Xd and Xe. On the other hand, in an area of luster 401 on an outer side of the pupil 302 (an area of an iris image on an outer side of the pupil image obtained by formation of light from an iris 143), a value in the middle of the aforementioned two brightness levels is obtained.

As described above, by paying attention to the brightness level, the X coordinates Xd and Xe of the corneal reflection images Pd' and Pe' and the X coordinates Xa and Xb of the pupil end images a' and b' can be obtained from the brightness distribution as illustrated in (B) of FIG. 4.

Moreover, if a rotation angle θx (see FIG. 3) of the optical axis of the eyeball 204 with respect to the optical axis of the light receiving lens 201 is small, a coordinate Xc of the pupil center image c' (center of the pupil image) obtained by formation of the light from the pupil center c on the image pickup element 121 for eyeball can be expressed as Xc≈(Xa+Xb)/2. That is, the coordinate Xc which is an X coordinate of the pupil center image c' can be estimated from the X coordinates Xa and Xb of the pupil end images a' and b'. As described above, the coordinate Xc of the pupil center image c' and the coordinates of the corneal reflection images Pd' and Pe' can be estimated.

At Step S504, the line-of-sight detection unit 120 calculates an image forming magnification β of the eyeball image. The image forming magnification β is a magnification determined by the position of the eyeball 204 with respect to the light receiving lens 201, and can be acquired by using a function of Xd−Xe which is an interval between the corneal reflection images Pd' and Pe'.

At Step S505, the line-of-sight detection unit 120 calculates a rotation angle of the optical axis of the eyeball 204 with respect to the optical axis of the light receiving lens 201. Here, the X coordinate of a middle point between the corneal reflection image Pd and Pe substantially matches the X coordinate of a curvature center O of the cornea 301. Thus, assuming that a standard distance from the curvature center O of the cornea 301 to the center c of the pupil 302 is Oc, a rotation angle θx of the eyeball 204 in a Z-X plane (plane perpendicular to the Y-axis) can be calculated from formula 1. It is to be noted that a rotation angle θy of the eyeball 204 in a Z-Y plane (plane perpendicular to the X-axis) can be also calculated by a method similar to the calculation method of the rotation angle θx.

$$\beta \times Oc \times \sin\theta x \approx \{(Xd+Xe)/2\} - Xc \quad \text{formula 1}$$

At Step S506, the line-of-sight detection unit 120 reads out correction coefficient data (coefficients m, Ax, Bx, Ay, By) stored in advance in the memory 107. The coefficient m is a constant determined by configuration of a finder optical system of the digital camera 100 and is a conversion coefficient for converting the rotation angles θx and θy to the coordinates corresponding to the pupil center c in a visual field image (image for visual recognition) in the finder. Moreover, the coefficients Ax, Bx, Ay, By are line-of-sight correction coefficients for correcting individual differences in the line-of-sights, obtained by performing a calibration work, and are stored in the memory 107 before starting the line-of-sight detection processing.

At Step S507, the line-of-sight detection unit 120 acquires the user's viewpoint (position of a gazed point; viewed position) in the image for visual recognition displayed on the display unit 113 by using the rotation angles θx, θy of the user's eyeball 204. Assuming that the coordinates (Hx, Hy) of the viewpoint are coordinates corresponding to the pupil center c, the coordinates (Hx, Hy) of the viewpoint can be calculated from the following formula 2 and formula 3.

$$Hx = m \times (Ax \times \theta x + Bx) \quad \text{formula 2}$$

$$Hy = m \times (Ay \times \theta y + By) \quad \text{formula 3}$$

At Step S508, the line-of-sight detection unit 120 stores the coordinates (Hx, Hy) of the viewpoint in the memory 107. Moreover, the line-of-sight detection unit 120 measures time during which the position of the line-of-sight remains in a certain area and stores the measured time as gazing time in the memory 107.

The method of obtaining the coordinates of the viewpoint on the display element using the corneal reflection images of the light sources 123a and 123b has been illustrated, but this is not limiting. The coordinates of the viewpoint (eyeball rotation angle) may be obtained by a well-known arbitrary method from the picked-up eyeball image.

(Focus Control Processing): Hereinafter, focus control processing of the digital camera 100 (control method of the digital camera 100) will be described by using FIG. 6. FIG. 6 is a flowchart of the focus control processing of the digital camera 100. The flowchart in FIG. 6 is realized by the CPU 114 executing the program stored in the ROM 109 and controlling each function unit at each Step. When an operation of instructing the AF control by the user is performed, the focus control processing is started.

At Step S601, the image pickup element 121 for eyeball obtains the eye image (image data) of the user to which the illumination of the light source 123 is emitted and outputs the eye image to the line-of-sight detection unit 120.

At Step S602, the line-of-sight detection unit 120 detects the user's line-of-sight (viewpoint) by the line-of-sight detection processing explained by using the flowchart in FIG. 5. The line-of-sight detection unit 120 calculates a viewed position (gazing point) in the live-view image displayed on the display unit 113 in the finder and outputs it to the line-of-sight vector detection unit 125. Moreover, the line-of-sight detection unit 120 obtains a viewpoint region 701 (a region viewed by the user in the display unit 113) which is a rectangular region with a predetermined size around the user's viewed position and outputs the viewpoint region 701 to the image processing unit 104. The viewpoint region 701 does not have to be rectangular but may be a shape such as an elliptic shape, a circular shape, a polygonal shape and the like.

At Step S603, the line-of-sight vector detection unit 125 calculates (obtains) a motion vector of the user's viewpoint region 701 (movement vector of the viewpoint) from a difference between the viewed position of a previous frame and the viewed position of a current frame and outputs it to the CPU 114. This difference does not have to be a difference between the continuous two frames but may be a difference in a predetermined period of time such as among at least three frames.

At Step S604, the image pickup element 102 obtains a picked-up image which picked up the subject (photographed region image; live-view image) and outputs it to the image processing unit 104 through the A/D conversion unit 103. That is, at this Step, it can be considered that the image processing unit 104 obtains the picked-up image from the image pickup element 102.

At Step S605, the image processing unit 104 obtains the motion vector from the previous frame of the image displayed on the viewpoint region 701 in the current frame (viewpoint region image), as the motion vector of the viewpoint region image. That is, the image processing unit 104 obtains the motion vector of the image from the previous frame to the current frame within a range of the viewpoint region 701 in the current frame, as the motion vector of the viewpoint region image. Here, the image processing unit 104 calculates the motion vector of the image in the viewpoint region 701 (viewpoint region image) as a feature amount in the picked-up image for determining whether or not an obstacle overlaps with the subject intended by the user. The comparison between the previous frame and the current frame (corresponding position search) in order to obtain the motion vector of the viewpoint region image is performed by a template matching method or the like, for example. Moreover, the image processing unit 104 outputs the motion vector of the viewpoint region image to the CPU 114.

At Step S606, the CPU 114 determines whether or not the motion vector of the viewpoint region 701 matches the motion vector of the viewpoint region image. That is, at Step S606, it is determined whether or not the subject displayed in the viewpoint region 701 has changed during one frame. The respective motion vectors are calculated on a coordinate reference of the picked-up image (live-view image) displayed by the display unit 113 in the finder. And if both the difference in the size of the two motion vectors and the difference in the directions are within a different range set in advance, the two motion vectors are determined to match each other. When the motion vector of the viewpoint region 701 is determined to match the motion vector of the viewpoint region image, the process proceeds to Step S607, while if it is determined not to match, the process proceeds to Step S608.

At Step S607, the CPU 114 controls the focus detection unit 122 and executes the focus control (AF; movement of the focus) by drive control of the focus lens of the focus control unit 118 so that the subject displayed on the viewpoint region 701 is focused as a first mode.

At Step S608, the CPU 114 does not execute the focus control to the subject displayed in the viewpoint region 701, does not change the focus (focus) from the previous frame but fixes it as a second mode.

At Step S609, the CPU 114 determines whether or not the user has performed an operation to end the image pickup (photographing). For example, if an operation to turn OFF the power of the digital camera 100 is performed or when the operation to instruct the AF is cancelled by the user, the focus control processing is finished.

Otherwise, the image pickup is continued, and the process returns to Step S601.

In the following, a difference in focusing (focus position) depending on presence/absence of application of the focus control processing according to the present embodiment will be described by using FIGS. 7A to 7H. FIGS. 7A to 7H illustrate frames of the live-view images (picked-up images) displayed on the display unit 113. FIGS. 7A to 7D illustrate frames of the live-view images when the AF control is executed on the basis of the user's line-of-sight all the time. FIGS. 7E to 7H illustrate the frames of the live-view images when the focus control processing of the present embodiment is applied.

Figure 7A:
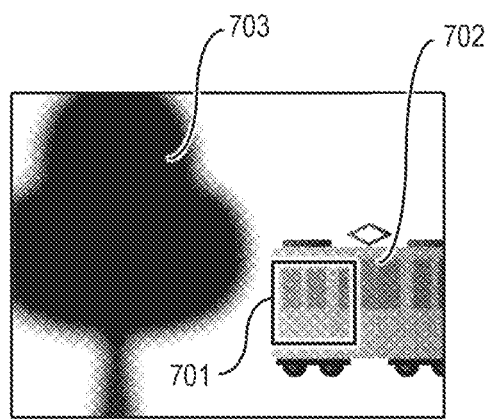
FIGS. 7A to 7D are views for explaining focus control according to conventional.
Figure 7B:
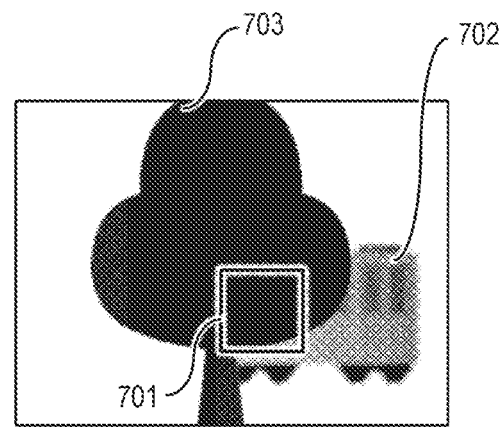
Figure 7C:
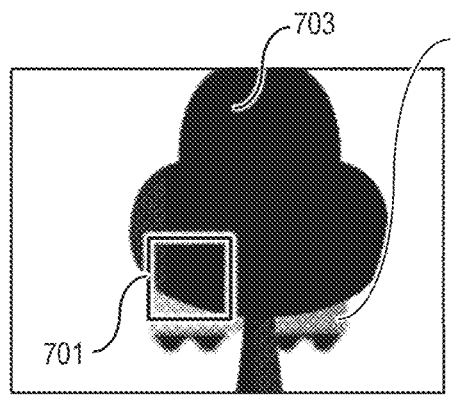
Figure 7D:
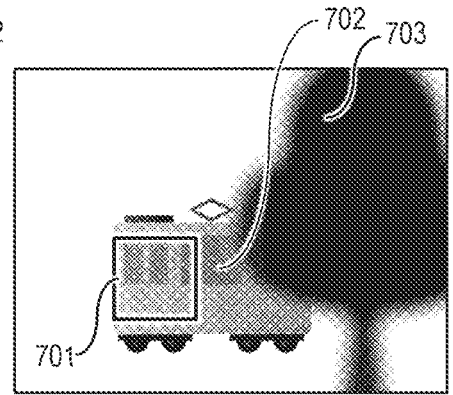
Figure 7E:
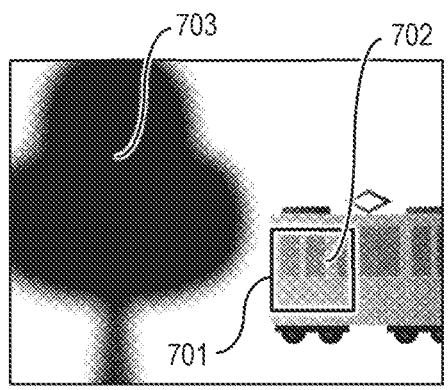
FIGS. 7E to 7H are views for explaining the focus control according to the embodiment 1.
Figure 7F:
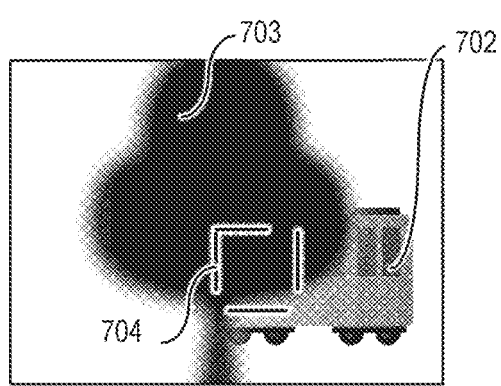
Figure 7G:
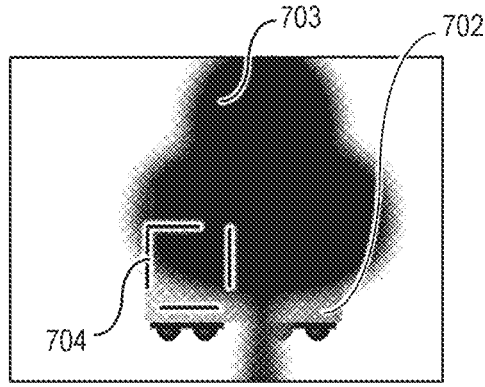
Figure 7H:
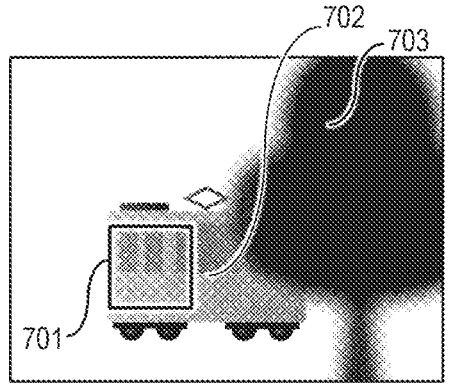

Moreover, FIGS. 7A and 7E illustrate a frame f1 of the live-view image, and FIGS. 7B and 7F illustrate a frame f2 which is a frame subsequent to the frame f1. FIGS. 7C and 7G illustrate a frame f3 which is a frame subsequent to the frame f2, and FIGS. 7D and 7H illustrate a frame f4 which is a frame subsequent to the frame f3.

Here, an example in which the focus control processing according to the present embodiment is not applied, but the focus control is executed to the viewpoint region 701 all the time will be described. In this case, if an obstacle 703 overlaps with a front surface of a major subject 702 to be intentionally focused by the user, the obstacle 703 is temporarily focused (focus). That is, if the obstacle 703 overlaps with the major subject 702 from a state where the major subject 702 is focused as illustrated in FIG. 7A, the state changes to a state where the obstacle 703 is focused as illustrated in FIGS. 7B and 7C.

Thus, during photographing of moving images, an image of a frame picked up at an unnecessary focus position is recorded, which deteriorates a quality of the moving images to be recorded. Moreover, during photographing of a still image, if the major subject 702 re-appears from behind the obstacle 703, as illustrated in FIG. 7D, time required for the focus control is prolonged, and an increase in a release time lag is concerned about.

On the other hand, an example in which the focus control processing according to the present embodiment is applied to the live-view image will be described. If the obstacle 703 overlaps in front of the major subject 702 as in the frame f2 illustrated in FIG. 7F from the state where the focus control is executed to the major subject 702 as in the frame f1 illustrated in FIG. 7E, the motion vector cannot be obtained for the major subject 702 in the viewpoint region image. Thus, the motion vector of the user's viewpoint region 701 does not match the motion vector of the viewpoint region image. Therefore, in FIG. 7F, the focus control is not executed to the viewpoint region 704, but the focusing (focus) is fixed to the position where the major subject 702 was (is) present. Similarly, in the frame f3 illustrated in FIG. 7G, too, the focusing is fixed. After that, as illustrated in FIG. 7H, if the major subject 702 re-appears, the focus control to the major subject 702 is resumed.

As described above, in the present embodiment, when the motion vectors of the viewpoint region and the viewpoint region image match each other, the digital camera determines that the subject displayed on the viewpoint region is the subject intended by the user, operates in the first mode, and focuses on the subject. On the other hand, if the two motion vectors do not match each other, the digital camera determines that the subject displayed on the viewpoint region has changed from the subject intended by the user to another subject, operates in the second mode, and does not change the focusing (focus). That is, in the present embodiment, it can be considered that the digital camera switches between the first mode and the second mode on the basis of the motion vector of the viewpoint region and the motion vector of the viewpoint region image (feature amount based on the picked-up image).

Therefore, in the present embodiment, even if another subject overlaps in front of the subject intended by the user, focusing on another subject can be prevented. That is, there is no unnecessary focus change, and a problem of the deterioration in the quality of the moving images or the increase in the release time lag can be solved or a possibility of occurrence of such problems can be reduced. That is, according to the present embodiment, the unnecessary focus control to the subject not intended by the user can be reduced, and the continuous AF to the subject intended by the user can be performed. Thus, moving images with good appearance can be recorded, and a loss of a photographing opportunity can be reduced by improving a response in the still-image photographing.

Moreover, even if the subject followed by the line-of-sight of the user is switched, if the motion vector of the viewpoint region after the switching matches the motion vector of the viewpoint image region, the focus control is executed to the subject after the switching. Therefore, the AF following characteristics can be also improved.

The detection method on the premise that the user looks into the finder was described as the line-of-sight detection method, but this is not limiting. For example, a line-of-sight when the user is looking at the display on a rear-surface panel may be detected. Moreover, the processing at each Step of the aforementioned flowchart may be executed by dedicated hardware instead of the aforementioned function unit such as the CPU 114.

Embodiment 2

The digital camera 100 according to an embodiment 2 will be described. In the embodiment 2, the digital camera 100 executes the focus control processing by using distance information between the digital camera 100 (image pickup element 102) and the subject as a feature amount of the picked-up image, instead of the motion vector of the viewpoint region image.

Configuration of the digital camera 100 according to the present embodiment is identical to the configuration of the digital camera 100 according to the embodiment 1. Moreover, since a part of the focus control processing of the digital camera 100 according to the present embodiment is identical to the focus control processing according to the embodiment 1, only different portions will be described, and the description on the identical portion will be omitted.

FIG. 8 is a flowchart of the focus control processing of the digital camera 100 according to the present embodiment. The flowchart in FIG. 8 is realized by the CPU 114 executing the program stored in the ROM 109 and controlling each function unit at each Step. When the operation of instructing the AF control by the user is performed, and the focus control processing is started, the processing from Step S601 to Step S604 as described by using FIG. 6 is executed.

At Step S801, the image processing unit 104 generates an image for phase difference AF (image-plane phase difference image) from the picked-up image (image data) obtained by the image pickup element 102. For example, the image processing unit 104 may extract only the data of dedicated pixels for the phase difference AF so as to generate the image for phase difference AF or may generate the image for phase difference AF configured only by each of the data of the photodiodes divided in each pixel.

At Step S802, the image processing unit 104 obtains distance information in the viewpoint region (information on a distance D between the digital camera 100 and the subject) on the basis of the image for phase difference AF as the feature amount. Here, in the present embodiment, the distance D between the digital camera 100 and the subject is an optical distance between the image pickup element 102 and the subject. For calculation of the distance information, if there are right and left, that is, two in total of divided pixels in each pixel of the image for phase difference AF, for example, the image processing unit 104 performs a correlation value calculation of a value of the left divided pixel and a value of the right divided pixel included in the same line in the horizontal direction. Subsequently, the image processing unit 104 calculates the distance D between the digital camera 100 and the subject in an actual space on the basis of parallax between the divided pixels with the highest correlation value, a pixel pitch of the image pickup element 102 and the like.

At Step S803, the CPU 114 manages the information of the motion vector of the viewpoint region and the information of the distance D in the viewpoint region as time-series data and obtains a change amount from the previous frame to the current frame of the time-series data (the motion vector and the distance D of the viewpoint region).

At Step S804, the CPU 114 determines whether or not a change amount of the motion vector of the viewpoint region is not more than a threshold value TH1 set in advance and the change amount of the distance D in the viewpoint region is not more than a threshold value TH2 set in advance. If it is determined that both the two change amounts are not more than the threshold values, the process proceeds to Step S805, while if even either one of them is determined to be larger than the threshold value set in advance, the process proceeds to Step S806.

At Step S805, the CPU 114 determines whether or not the focus control to the viewpoint region has been executed in the previous frame (whether or not the processing at Step S607 has been executed in the previous frame). If the focus control to the viewpoint region was executed in the previous frame, it can be determined to be a state where the major subject is continuously being followed and thus, the process proceeds to Step S607. If the focus control to the viewpoint region was not executed in the previous frame, it can be determined to be a state where the obstacle overlaps in front of the major subject continues and thus, the process proceeds to Step S608.

At Step S806, the CPU 114 determines whether or not only the change amount of the distance D in the viewpoint region is larger than the threshold value. That is, it is determined whether or not the change amount of the motion vector of the viewpoint region is not more than the threshold value TH1. If only the change amount of the distance D in the viewpoint region is larger than the threshold value (if the change amount of the motion vector of the viewpoint region is not more than the threshold value TH1), the process proceeds to Step S807. Otherwise, the process proceeds to Step S808.

At Step S807, the CPU 114 determines whether or not the distance D in the viewpoint region has returned to a distance Df (the distance D in the first mode that immediately precedes) between the subject in the viewpoint region and the digital camera 100 immediately before it changes to a value larger than a threshold value TH2. For example, if a difference between the distance D and the distance Df in the viewpoint region is within a predetermined value, it can be determined that the distance D in the viewpoint region has returned to the value of the distance Df. When it is determined that the distance D in the viewpoint region has returned to the value of the distance Df, the process proceeds to Step S607. Otherwise, the process proceeds to Step S608.

At Step S808, the CPU 114 determines whether or not only the change amount of the motion vector of the viewpoint region is larger than the threshold value. That is, it is determined whether or not the distance D in the viewpoint region is not more than the threshold value TH2. If only the change amount of the motion vector of the viewpoint region is larger than the threshold value (if the change amount of the distance D is not more than the threshold value TH2), it can be determined that the user switched the subject to be followed or the subject with irregular motion is being followed and thus, the process proceeds to Step S607. Otherwise, it can be determined that such a state occurs that the user temporarily checks the surrounding situations or the information displayed in the finder and thus, the process proceeds to Step S608.

The processing from Step S607 to Step S609 is similar to the processing described in the embodiment 1.

As described above, in the present embodiment, in the case of the following (1) to (3), the CPU 114 determines that the subject intended to be focused by the user is not displayed in the viewpoint region and does not execute the focus control (operates in the second mode). Instead of the "between the continuous two frames" in the following (1) to (3), the "predetermined period among a plurality of frames and the like" may be used.

(1) The case where the change amount of the motion vectors of the viewpoint region between the continuous two frames is not more than the threshold value TH1 and the change amount of the distance D between the continuous two frames is not more than the threshold value TH2 and also, the focus control is not executed in the previous frame (operating in the second mode). That is, the case of YES at Step S804 and NO at Step S805.

(2) The case where the change amount of the motion vectors of the viewpoint region between the continuous two frames is not more than the threshold value TH1 and the change amount of the distance D between the continuous two frames is larger than the threshold value TH2, and it is determined that the distance D after the change has not returned to the distance Df. That is, the case of NO at Step S804, YES at Step S806, and NO at Step S807.

(3) The case where the change amount of the motion vectors of the viewpoint region between the continuous two frames is larger than the threshold value TH1 and the change amount of the distance D between the continuous two frames is larger than the threshold value TH2. That is, the case of NO at Step S804, NO at Step S806, and NO at Step S808.

On the other hand, in the case of the following (4) to (6), the CPU 114 determines that the subject intended by the user is displayed in the viewpoint region and executes the focus control so that the subject in the viewpoint region is focused (operates in the first mode). Instead of the "between the continuous two frames" in (4) to (6), the "predetermined period among a plurality of frames and the like" may be used.

(4) The case where the change amount of the motion vectors of the viewpoint region between the continuous two frames is not more than the threshold value TH1 and the change amount of the distance D between the continuous two frames is not more than the threshold value TH2 and also, the focus control is executed in the previous frame (operating in the first mode). That is, the case of YES at Step S804 and YES at Step S805.

(5) The case where the change amount of the motion vectors of the viewpoint region between the continuous two frames is not more than the threshold value TH1 and the change amount of the distance D between the continuous two frames is larger than the threshold value TH2, and it is determined that the distance D after the change has returned to the distance Df. That is, the case of NO at Step S804, YES at Step S806, and YES at Step S807.

(6) The case where the change amount of the motion vectors of the viewpoint region between the continuous two frames is larger than the threshold value TH1 and the change amount of the distance D between the continuous two frames is not more than the threshold value TH2. That is, the case of NO at Step S804, NO at Step S806, and YES at Step S808.

Here, in the present embodiment, too, similarly to the embodiment 1, the focus control is executed in the live-view image as illustrated in FIGS. 7E to 7H. The distance D in the viewpoint region and the motion vector of the viewpoint region 701 at this time are illustrated in FIGS. 9A and 9B.

At this time, even during the period when the obstacle 703 overlaps in front of the major subject 702, the user's line-of-sight continuously follows the major subject 702. Thus, as illustrated in FIG. 9B, the motion vector of the user's viewpoint region 701 does not change largely in accordance with movement of the major subject 702 but is substantially constant.

Figure 9A:
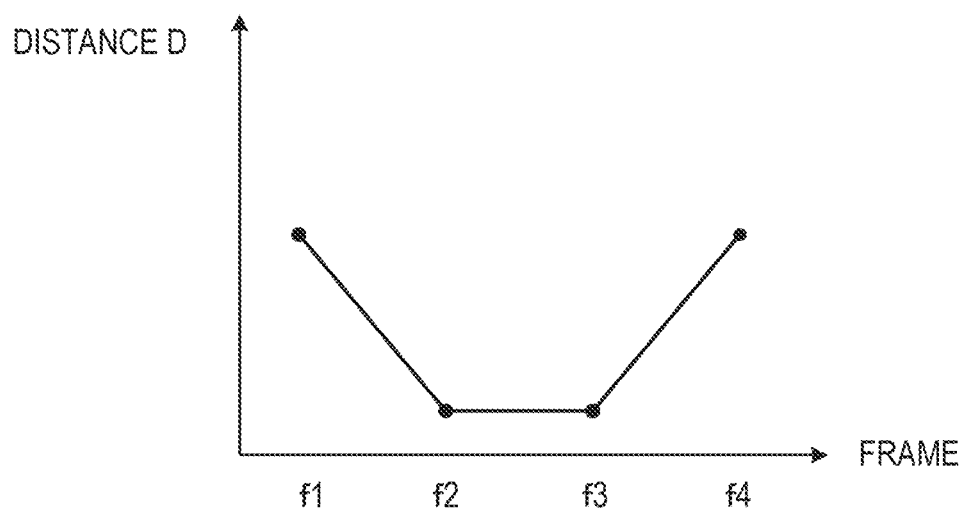
FIG. 9A is a view illustrating a distance according to the embodiment 2.
Figure 9B:
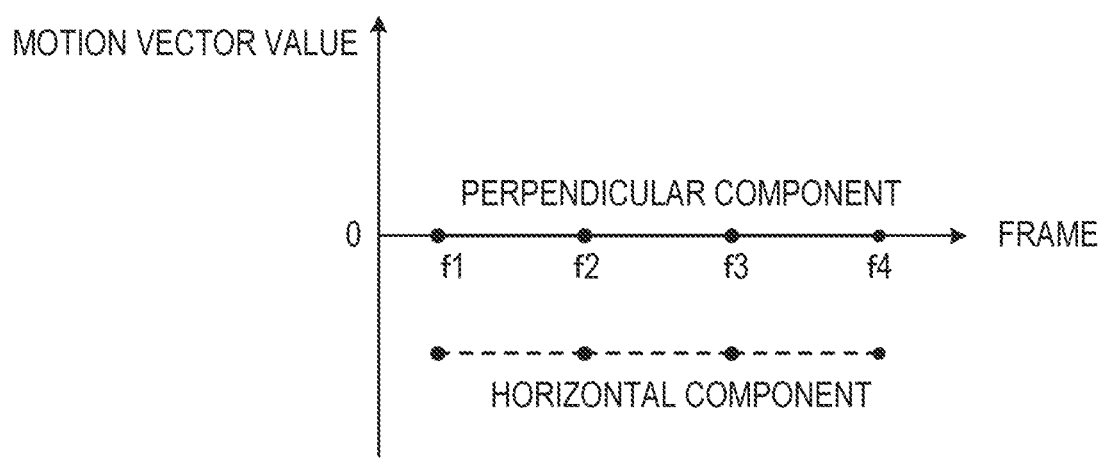
FIG. 9B is a view illustrating a motion vector of a line-of-sight region according to the embodiment 2.

On the other hand, as illustrated in FIG. 9A, the distance D of the viewpoint region shows a large change of the frame f2 (see FIG. 7F) in which the obstacle 703 overlaps in front of the major subject 702.

As described above, the motion vector of the viewpoint region 701 does not change largely, but if the distance D in the viewpoint region changes largely (YES at Step S806 and NO at Step S807), the digital camera 100 determines that the obstacle 703 overlaps in front of the major subject 702. Thus, the digital camera 100 does not execute the focus control. In the frame f3 illustrated in FIG. 7G, since there is no change from the state where the obstacle 703 overlaps, the focusing is continuously fixed. In the frame f4 illustrated in FIG. 7H, a large change occurs only in the distance D in the viewpoint region, and since it changes to the vicinity of the distance in the frame f1 before the previous change (YES at Step S807), it can be determined that overlapping of the obstacle 703 is solved. Thus, the digital camera 100 resumes the focus control to the viewpoint region 701.

(The Case of Image Pickup of the Other Live-View Images): Moreover, FIGS. 10A to 10D illustrate each of the frames of the live-view images (picked-up images) when the major subject 702 moves also in the optical axis direction as time elapses. FIGS. 10A to 10D illustrate the frames f1 to f4, respectively. FIGS. 11A and 11B illustrate the distance D in the viewpoint region and the motion vectors of the viewpoint region 701.

At this time, even while the obstacle 703 overlaps in front of the major subject 702, the user's line-of-sight continuously follows the major subject 702. Thus, as illustrated in FIG. 11B, the motion vector of the user's viewpoint region 701 does not show a large change in accordance with the movement of the major subject 702 but is substantially constant. On the other hand, the distance D in the viewpoint region largely changes in the frame f2 (see FIG. 10B) where the obstacle 703 deeply enters as illustrated in FIG. 11A. As described above, if the motion vector of the viewpoint region 701 does not change largely and the distance D in the viewpoint region largely changes, the digital camera 100 determines that the obstacle 703 overlaps the major subject 702 and does not execute the focus control (fixes focusing).

Figure 10A:
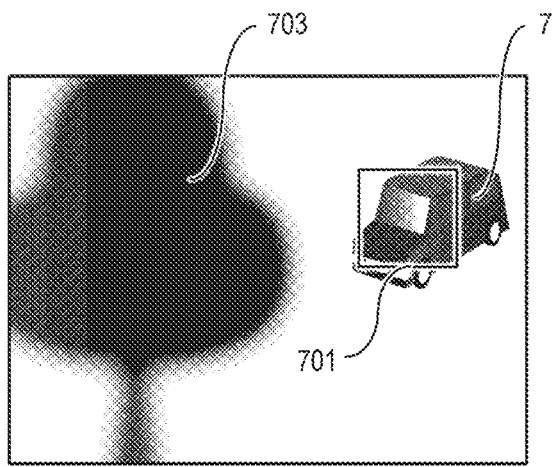
FIGS. 10A to 10D are views for explaining the focus control according to the embodiment 2.
Figure 10B:
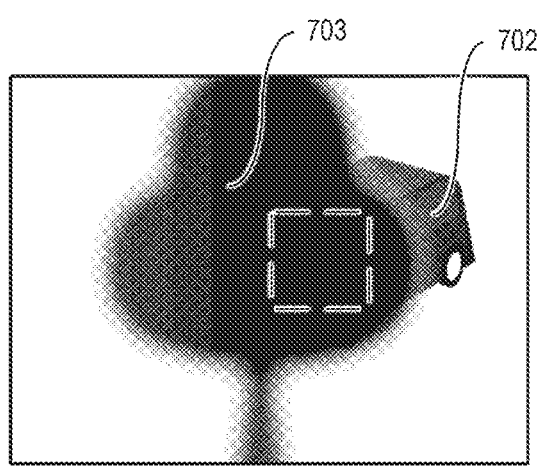
Figure 10C:
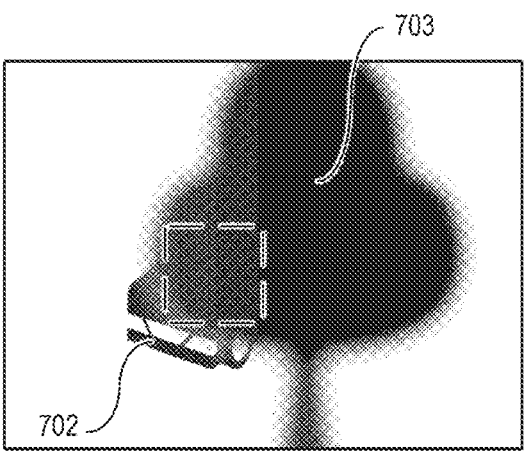
Figure 10D:
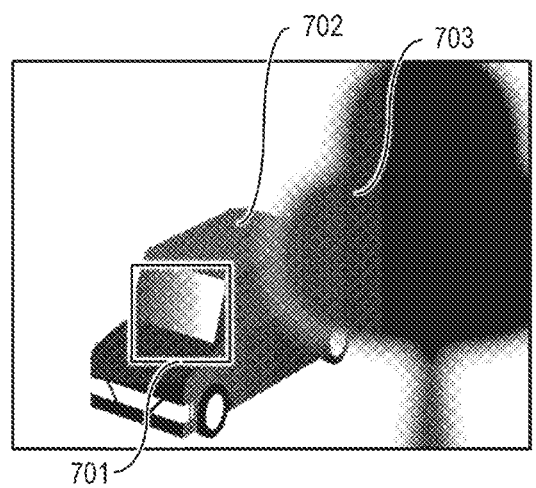
Figure 11A:
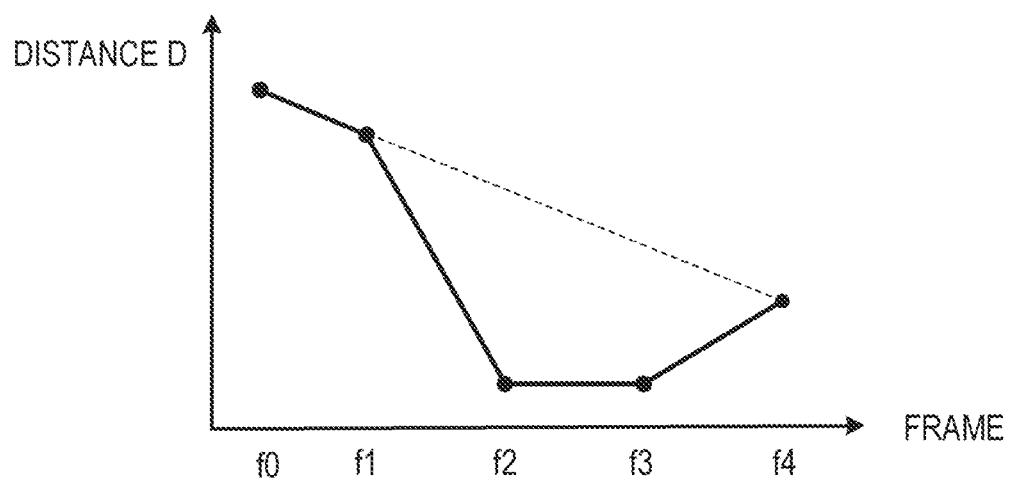
FIG. 11A is a view illustrating the distance according to the embodiment 2.
Figure 11B:
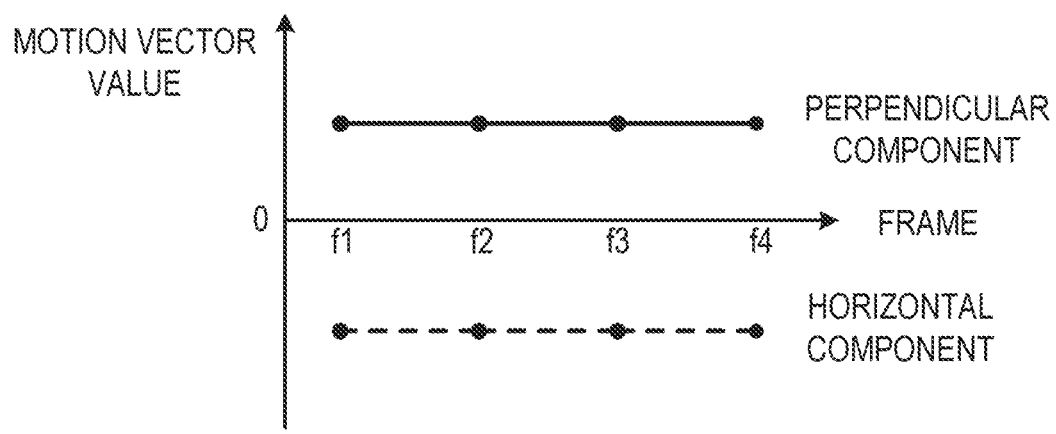
FIG. 11B is a view illustrating a motion vector of the line-of-sight region according to the embodiment 2.
Figure 12A:
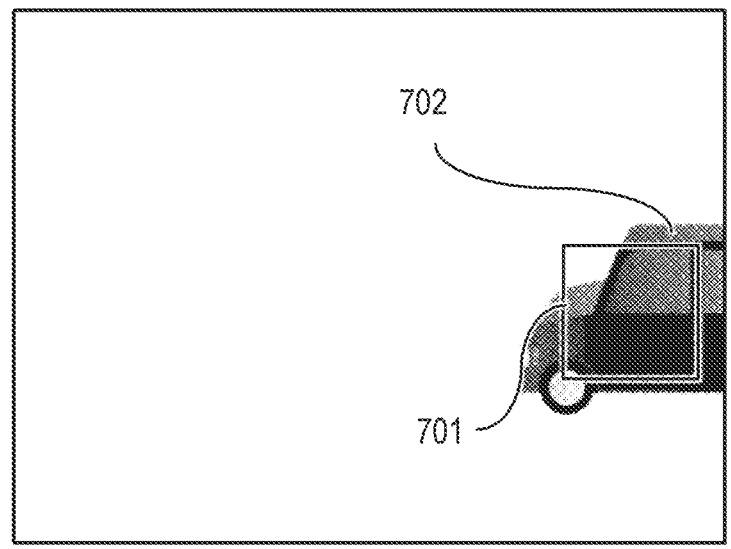
FIGS. 12A to 12E are views for explaining the focus control according to the embodiment 2.
Figure 12B:
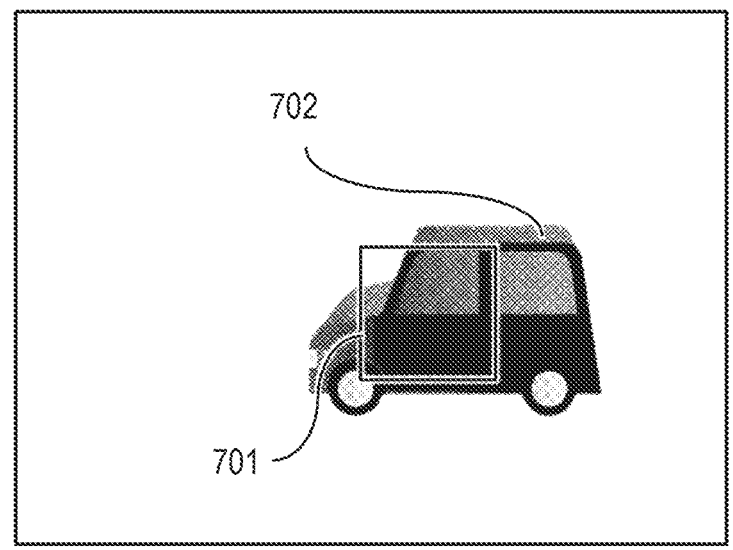
Figure 12C:
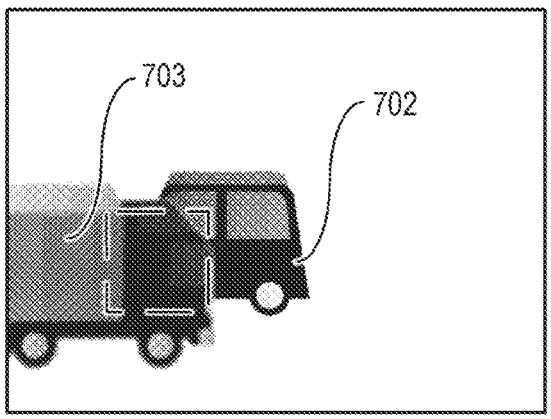
Figure 12D:
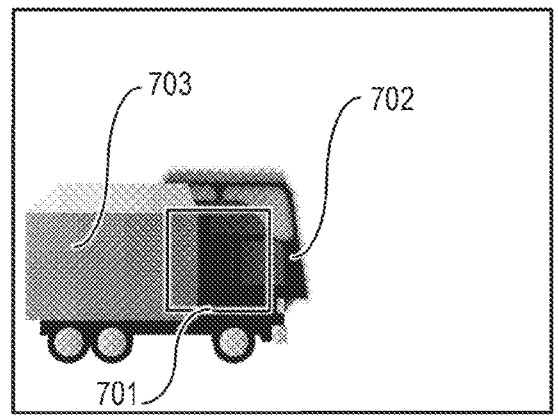
Figure 12E:
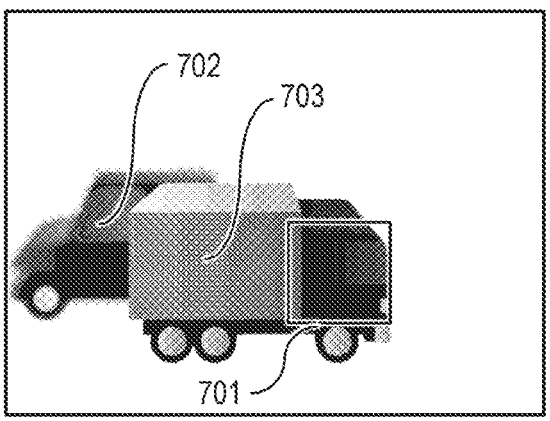

Moreover, in the frame f3 illustrated in FIG. 10C, since there is no change from the state where the obstacle 703 overlaps, the digital camera 100 continuously fixes focusing. In the frame f4 illustrated in FIG. 10D, a large change occurred again only in the distance D in the viewpoint region, and the distance D changed to the vicinity of a predicted value (predicted distance) on the basis of the distance Df when the focus control was executed immediately before. Thus, the digital camera 100 determines that the overlapping of the obstacle 703 is solved and resumes the focus control to the viewpoint region 701. As described above, conditions for resuming the focus control are not only the condition that the distance D returns to the distance Df but may be a condition that the distance D changes within a predetermined value from the predicted distance estimated on the basis of the distance D when the focus control was executed immediately before. For example, as illustrated in FIG. 11A, the condition is considered to be satisfied if a change rate from the distance D in the frame f1 to the distance D in the frame f4 is within a predetermined range from the change rate from the distance D in the frame f0, which is one before the frame f1, to the distance D in the frame f1.

Figure 13A:
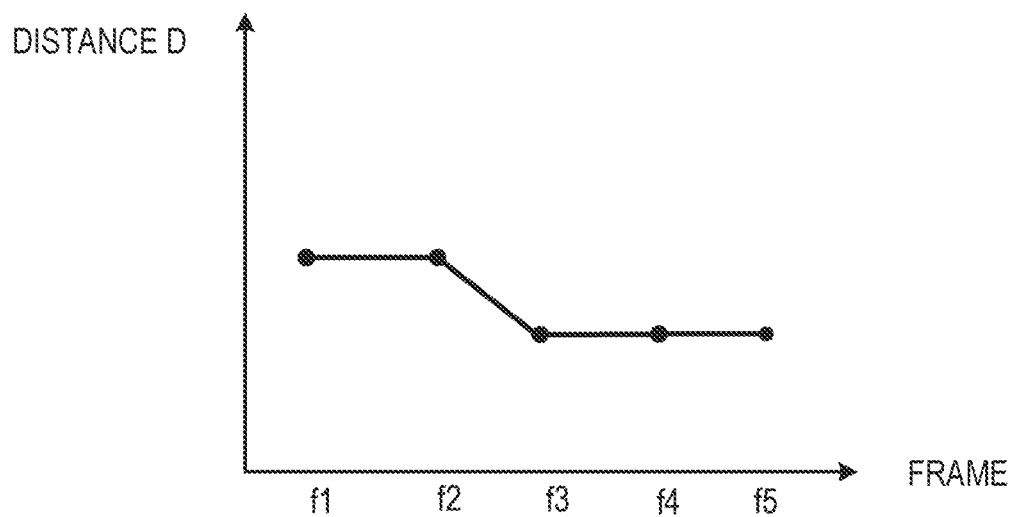
FIG. 13A is a view illustrating the distance according to the embodiment 2.
Figure 13B:
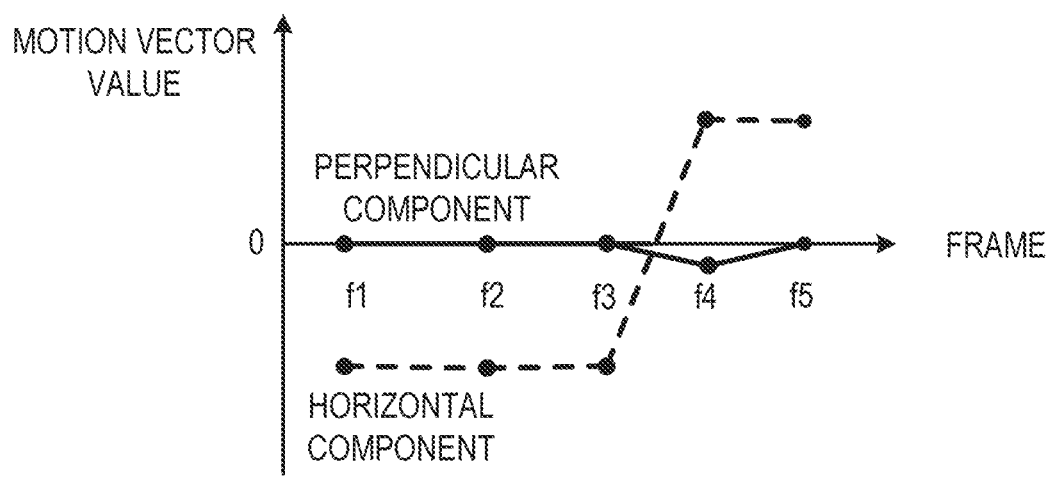
FIG. 13B is a view illustrating the motion vector of the line-of-sight region according to the embodiment 2.

(The Case of Image Pickup of the Other Live-View Images:) Moreover, FIGS. 12A to 12E illustrate each frame of the live-view image when the user switches the obstacle 703 which has entered to a target of the focus control. FIGS. 12A to 12E illustrate the frames f1 to f5, respectively. FIGS. 13A and 13B illustrate the distance D in the viewpoint region and the motion vectors of the viewpoint region 701.

As illustrated in FIG. 13B, the user's line-of-sight continuously follows the major subject 702 until the frame f3 (see FIG. 12C) in which the obstacle 703 overlaps in front of the major subject 702. Thus, the motion vector of the user's viewpoint region 701 does not show a large change in accordance with the movement of the major subject 702 but is substantially constant until the frame f3. On the other hand, as illustrated in FIG. 13A, the distance D in the viewpoint region shows a large change in the frame f3 in which the obstacle 703 overlaps with the major subject 702. If the motion vector of the viewpoint region 701 does not have a large change and a large change occurs in the distance in the viewpoint region as above (YES at Step S806 and NO at Step S807), the digital camera 100 determines that the obstacle 703 overlaps the major subject 702. And the digital camera 100 does not execute the focus control (fixes the focusing).

Here, if the user's line-of-sight changes so as to follow the obstacle 703, the viewpoint region 701 moves to a position of the subject which moves differently from before. Thus, in the frame f4 (see FIG. 12D), a large change occurs in the motion vector of the viewpoint region 701 without a large change in the distance D in the viewpoint region. If a large change occurs only in the motion vector of the viewpoint region 701 without a large change in the distance D in the viewpoint region as above (YES at Step S806 and YES at Step S808), it is determined that the target of the focus control has been switched to the obstacle 703. Thus, the digital camera 100 resumes the focus control to the viewpoint region 701.

As described above, the focus control to the viewpoint region is executed on the basis of the time-series change of the motion vector of the viewpoint region and the distance information in the viewpoint region. As a result, even if the obstacle overlaps the major subject similarly to the embodiment 1, a change in the focusing point does not occur unnecessarily. Thus, deterioration in the moving image quality or an increase in release time lag can be reduced. Moreover, even if the user suddenly switches the target of the focus control, the focus control to the viewpoint region can be resumed at once, and the subject intended by the user can be focused.

Moreover, an example in which the focus control is executed on the basis of the time-series data of the motion vector of the viewpoint region and the distance information in the viewpoint region has been explained, but this is not limiting. For example, overlapping of the subject in the live-view image may be detected by using color information or texture information instead of the distance information in the viewpoint region. In this case, the "change in the distance D in the viewpoint region" in the present embodiment shall read the "change in the color or the change in the texture in the viewpoint region", whereby the effect similar to the present embodiment can be obtained. Moreover, by reading the recitation of the "change amount" in the present embodiment as the "change rate", too, the effect similar to the present embodiment can be obtained. If the user's line-of-sight continuously follows the subject accelerating or decelerating at a constant acceleration degree, the motion vector of the viewpoint region or the change rate of the distance D is substantially constant and thus, the reading as the "change rate" is suitable.

Embodiment 3

A digital camera 1400 according to an embodiment 3 will be described by referring to FIG. 14. In the embodiment 3, the digital camera 1400 does not obtain the distance information in the viewpoint region from the picked-up image (phase difference image) but by another distance measuring method.

Configuration and the focus control processing of the digital camera 1400 according to the present embodiment is identical to a part of the configuration and the focus control processing of the digital camera 100 according to the embodiment 2. Thus, in the following, only portions different from the embodiment 2 will be described, while the explanation on the identical portions will be omitted.

Figure 14:
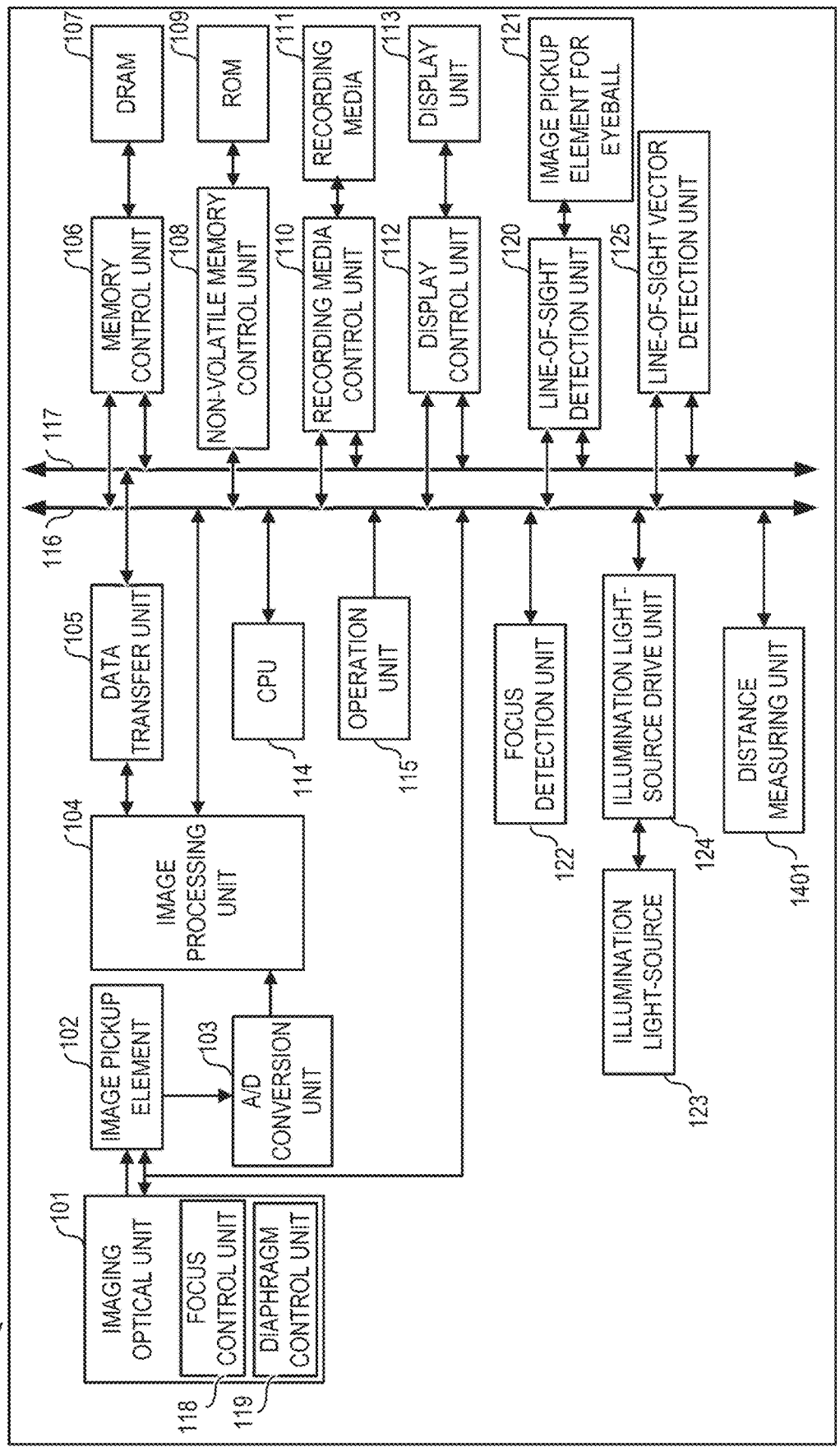
FIG. 14 is a configuration diagram of a digital camera according to an embodiment 3.

FIG. 14 is a configuration diagram of the digital camera 1400 according to the present embodiment. The digital camera 1400 has a distance measuring unit 1401 in addition to the function units of the digital camera 100 according to the embodiment 1.

The distance measuring unit 1401 obtains (measures) the distance D between the subject captured in the picked-up image and the digital camera 1400. That is, the distance measuring unit 1401 obtains the distance D between the subject present in an image pickup range for picking up a picked-up image and the digital camera 1400. For example, the distance measuring unit 1401 is a distance sensor including a combination of an LED for light projection and a photodiode for light reception required for distance measurement of Time-of-flight type or a combination of a projector and a camera required for the distance measurement of a pattern irradiation type.

In the present embodiment, in the focus control processing (processing in FIG. 8), instead of the processing at Step S801 and Step S802 executed by the image processing unit 104, the distance measuring unit 1401 obtains the distance information in the viewpoint region. The other processing in the focus control processing according to the present embodiment is the processing similar to the focus control processing according to the embodiment 2.

As described above, the effect similar to the embodiment 2 can be obtained by using another distance measuring method instead of obtainment of the distance information from the image for phase difference AF (phase difference image).

Embodiment 4

In the following, a digital camera 1500 according to an embodiment 4 will be described. In the embodiment 4, the digital camera 1500 executes the focus control to the viewpoint region on the basis of a positional relationship between the viewpoint region and a subject region in the picked-up image. A part of configuration and the focus control processing of the digital camera 1500 according to the present embodiment is identical to the configuration and the focus control processing of the digital camera 100 according to the embodiment 1. Thus, in the following, only portions different from the embodiment 1 will be described, while the explanation on the identical portions will be omitted.

Figure 15:
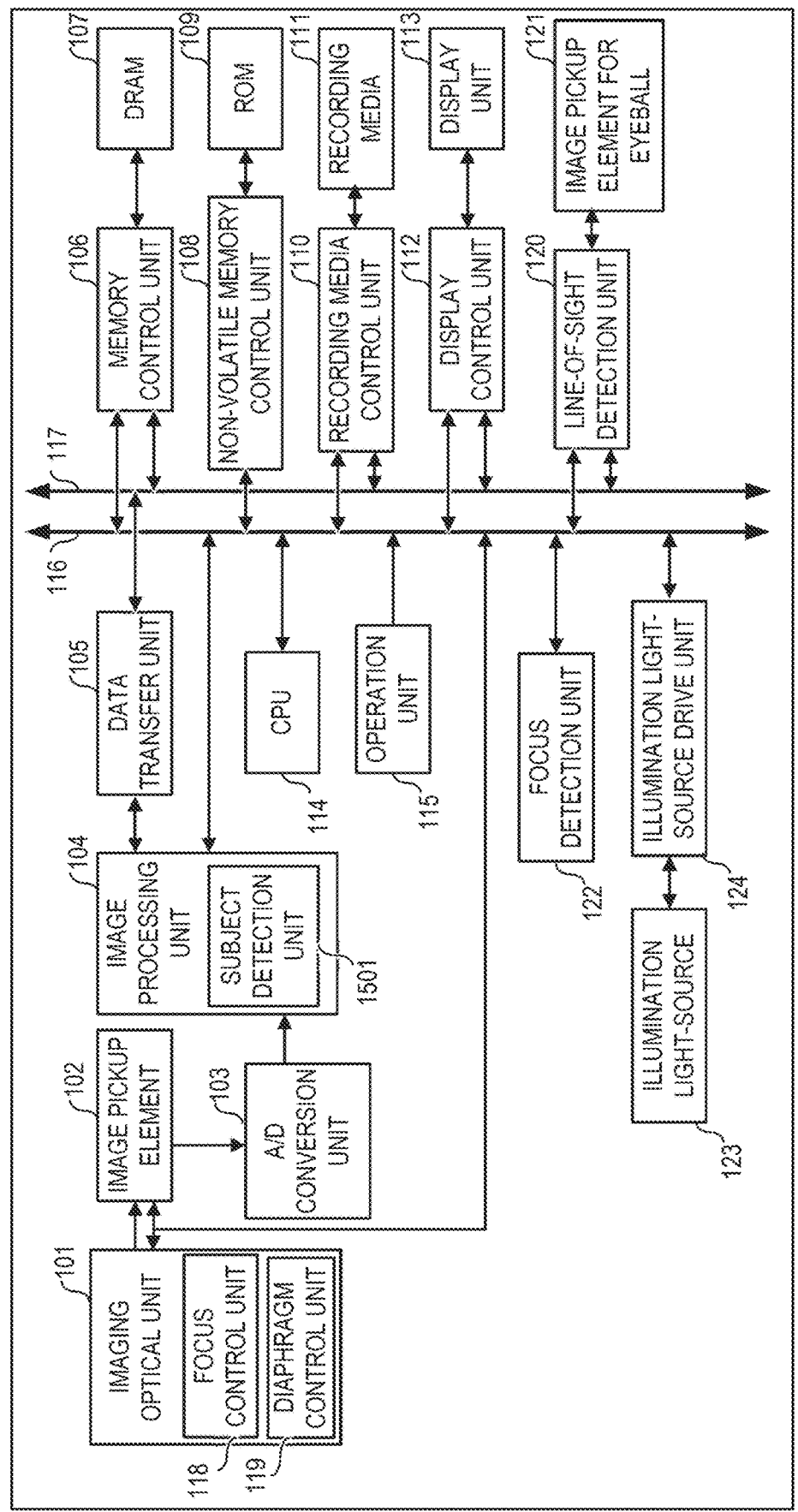
FIG. 15 is a configuration diagram of a digital camera according to an embodiment 4.

(Configuration of the Digital Camera): FIG. 15 is a configuration diagram of the digital camera 1500 according to the present embodiment. The digital camera 1500 has a subject detection unit 1501 inside the image processing unit 104. On the other hand, the digital camera 1500 does not have the line-of-sight vector detection unit 125 unlike the embodiment 1.

The subject detection unit 1501 detects a major subject (a specific subject) on the basis of the picked-up image. In the present embodiment, the major subject can be a person, an animal, a ride and the like assumed by the user to become a target of the AF. Moreover, the subject detection unit 1501 obtains a region of the major subject in the picked-up image (subject region) as a feature amount in the picked-up image. For the detection of the subject, a known art such as face detection, human body detection, deep learning and the like can be used, for example.

Figure 16:
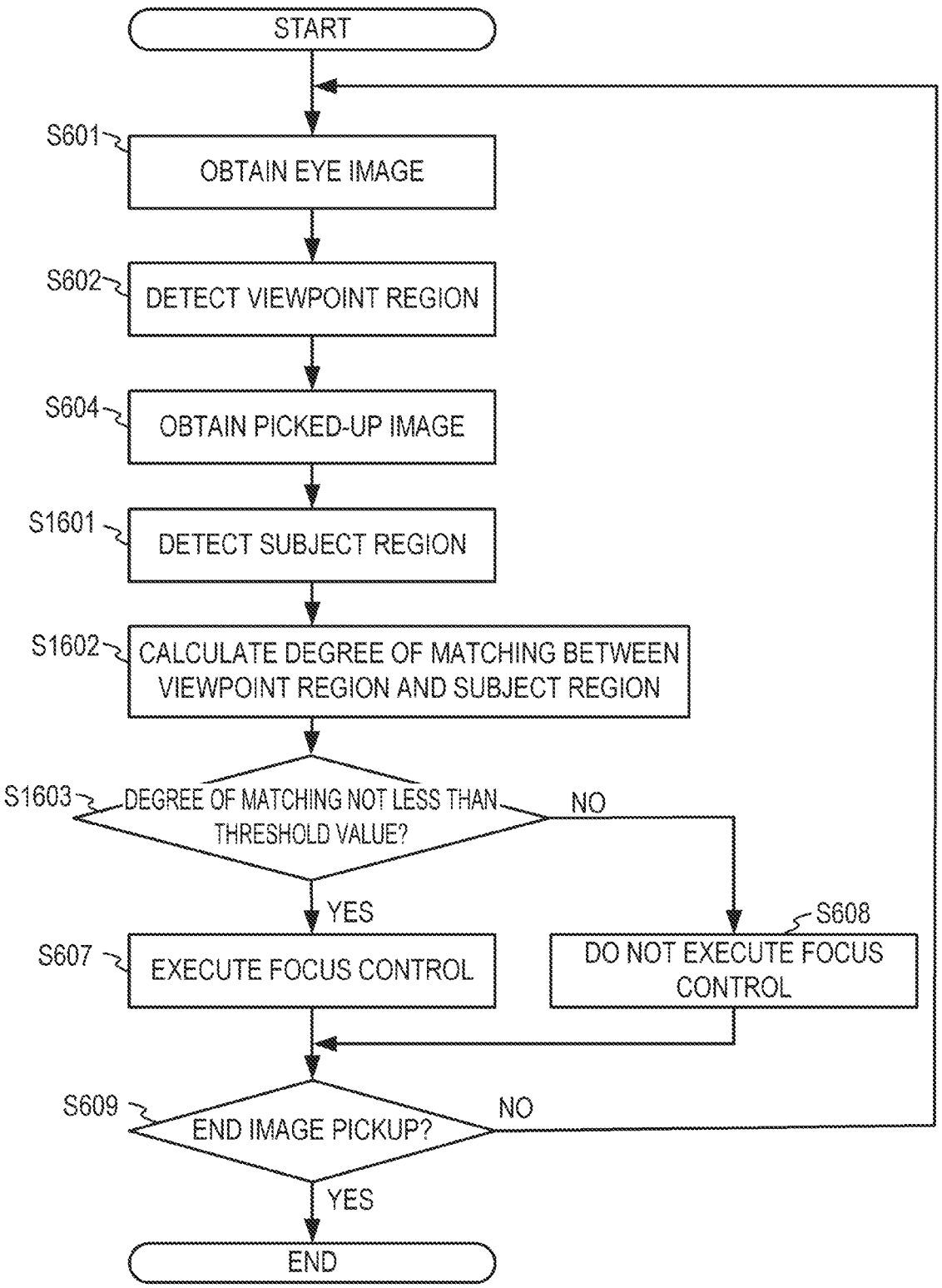
FIG. 16 is a flowchart of the focus control processing according to the embodiment 4.

(Focus Control Processing): Subsequently, the focus control processing will be described by referring to FIG. 16. FIG. 16 is a flowchart of the focus control processing in the present embodiment. The flowchart in FIG. 16 is realized by the CPU 114 executing the program stored in the ROM 109 and controlling each function unit at each Step. When the operation of instructing the AF control by the user is performed, and the focus control processing is started, the processing at Step S601, Step S602, and Step S604 is executed.

At Step S1601, the subject detection unit 1501 detects a subject region 1701 which is a region of the major subject in the picked-up image from the photographed region image (picked-up image) by using the known art as described above. The subject detection unit 1501 outputs the information of the subject region 1701 to the CPU 114.

At Step S1602, the CPU 114 compares the viewpoint region 701 detected at Step S602 with the subject region 1701 and determines a degree of matching between the two regions. The degree of matching between the two regions is a rate of overlapping of the two regions (a rate of a size of a region where the two regions overlap each other with respect to the entire size of the viewpoint region 701), an inverse number of the distance between center positions of the two regions or the like.

At Step S1603, the CPU 114 determines whether or not the degree of matching between the viewpoint region 701 and the subject region 1701 is at least a predetermined threshold value set in advance. If the degree of matching between the two regions is at least the predetermined threshold value, the process proceeds to Step S607, while if the degree of matching between the two regions is less than the predetermined threshold value, the process proceeds to Step S608.

For example, FIGS. 17A to 17D illustrate a positional relationship between the viewpoint region 701 and the subject region 1701. FIGS. 17A to 17D illustrate each frame of the live-view image when the AF control was executed on the basis of the user's line-of-sight.

Figure 17A:
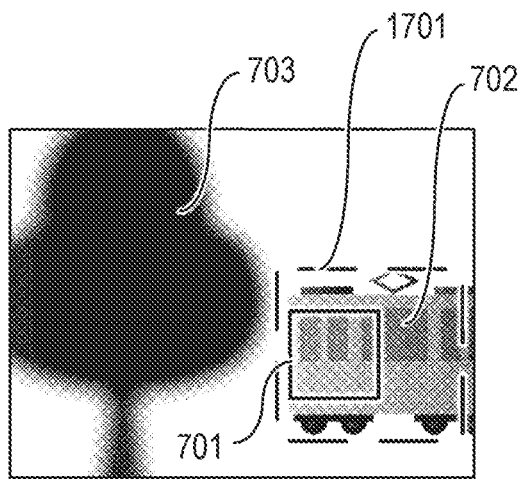
FIGS. 17A to 17D are views for explaining the focus control according to the embodiment 4.
Figure 17B:
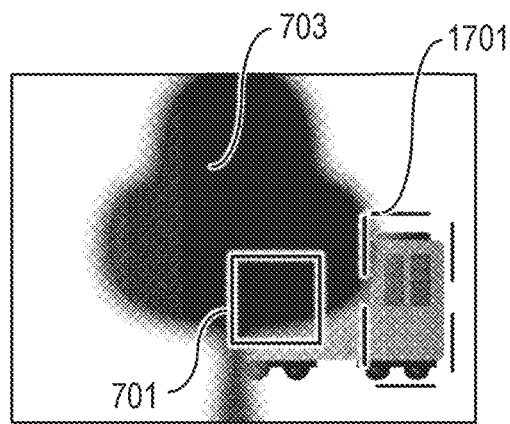
Figure 17C:
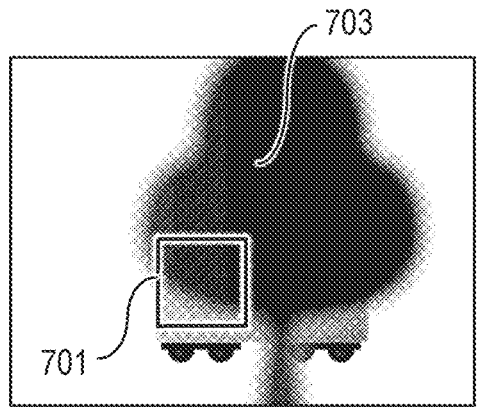
Figure 17D:
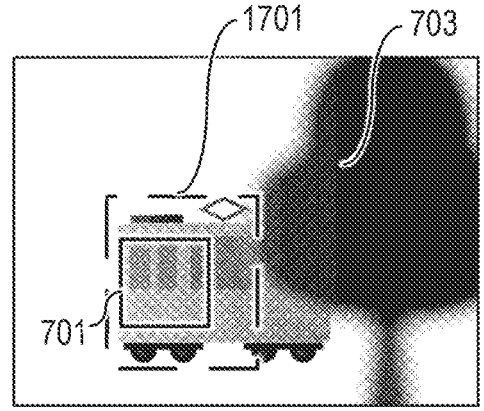

In FIG. 17A, since the detected viewpoint region 701 is included in the subject region 1701, it is determined that the degree of matching between the two regions is at least the predetermined threshold value, and the focus control is executed to the viewpoint region 701. In FIG. 17B, the detected viewpoint region 701 does not overlap the subject region 1701 and they are independent in the positional relationship and thus, it is determined that the degree of matching between the two regions is less than the predetermined threshold value, and the focus control is not executed to the viewpoint region 701 (focusing is fixed). In FIG. 17C, since the subject region 1701 is not detected due to an influence of the obstacle 703, the focus control is not executed to the viewpoint region 701 (focusing is fixed). In FIG. 17D, since the viewpoint region 701 is included in the subject region 1701, it is determined that the degree of matching between the two regions is at least the predetermined threshold value, and the focus control is executed to the viewpoint region 701.

As described above, by executing the focus control on the basis of the positional relationship between the viewpoint region and the subject region, too, the effect similar to the embodiment 1 can be obtained.

The viewpoint region and the subject region may be actually displayed as rectangular frames on the display unit 113 or may be handled as internal information of the digital camera 1500 without being displayed.

According to the present invention, the subject intended by the user can be continuously focused by the line-of-sight input.

Moreover, the present invention has been described in detail on the basis of preferred embodiments thereof, but the present invention is not limited to these specific embodiments but includes various forms in a range not departing from the gist of this invention. Furthermore, each of the aforementioned embodiments only illustrates an embodiment of the present invention, and each of the embodiments can be combined as appropriate.

Moreover, the present invention can be applied not only to the image pickup device main body but also to a control device (image-pickup control device) that communicates with the image pickup device (including a network camera) through wired or wireless communication and remotely controls the image pickup device. That is, it may be an image pickup control device that controls the image pickup element (image pickup unit) and the display unit according to the present embodiment. The device that remotely controls the image pickup device includes devices such as a smartphone, a tablet PC, and a desktop PC, for example. The image pickup device can be remotely controlled by notifying a command that causes the image pickup device to perform various operations and setting from the control device side on the basis of the operation performed on the control device side or processing executed on the control device side. Moreover, the live-view image photographed by the image pickup device may be made displayable on the control device side by receiving it via the wired or wireless communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic device comprising:
at least one memory and at least one processor which function as:
a display control unit configured to display a picked-up image picked up by an image pickup unit, on a display unit;
a line-of-sight detection unit configured to detect a line-of-sight of a user looking at the display unit; and
a focus control unit configured to control a focus of the image pickup unit to focus on an object displayed at a position based on the line-of-sight detected by the line-of-sight detection unit,
wherein
in a case where a motion vector of a first object displayed at the position based on the line-of-sight matches a motion vector of the position based on the line-of-sight, the focus control unit controls the focus of the image pickup unit to focus on the first object, and
in a case where the motion vector of the first object displayed at the position based on the line-of-sight does not match the motion vector of the position based on the line-of-sight, the focus control unit does not control the focus of the image pickup unit to focus on the first object.

2. The electronic device according to claim 1, wherein the case where the motion vector of the first object does not match the motion vector of the position based on the line-of-sight is a case where the motion vector of the position based on the line-of-sight is obtained but the motion vector of the first object is not obtained.

3. The electronic device according to claim 1, wherein in a case where the motion vector of the first object does not match the motion vector of the position based on the line-of-sight, the focus control unit controls the focus of the image pickup unit to fix the focus of the image pickup unit to a position of the focus of the image pickup unit set in a case where the motion vector of the first object matches the motion vector of the position based on the line-of-sight.

4. The electronic device according to claim 1, wherein in a case where the motion vector of the first object does not match the motion vector of the position based on the line-of-sight, even if a second object different from the first object is detected at the position based on the line-of-sight, the focus control unit does not control the focus of the image pickup unit to focus on the second object.

5. The electronic device according to claim 1, wherein the at least one memory and the at least one processor further function as a first calculation unit configured to calculate the motion vector of the position based on the line-of-sight by using a difference between a position based on a line-of-sight at a first timing and a position based on a line-of-sight at a second timing after a predetermined time from the first timing.

6. The electronic device according to claim 1, wherein the at least one memory and the at least one processor further function as a second calculation unit configured to calculate the motion vector of the first object by using a difference between a position of the first object in an image displayed on the display unit at a first timing and a position of the first object in an image displayed on the display unit at a second timing after a predetermined time from the first timing.

7. A control method of an electronic device, comprising:
displaying a picked-up image picked up by an image pickup unit, on a display unit;
detecting a line-of-sight of a user looking at the display unit; and
controlling a focus of the image pickup unit to focus on an object displayed at a position based on the detected line-of-sight,
wherein
in a case where a motion vector of a first object displayed at the position based on the line-of-sight matches a motion vector of the position based on the line-of-sight, the focus of the image pickup unit is controlled to focus on the first object, and
in a case where the motion vector of the first object displayed at the position based on the line-of-sight does not match the motion vector of the position based on the line-of-sight, the focus of the image pickup unit is not controlled to focus on the first object.

8. A non-transitory computer readable medium that stores a program, wherein the program causes a computer to execute a control method of an electronic device, the control method comprising:
displaying a picked-up image picked up by an image pickup unit, on a display unit;
detecting a line-of-sight of a user looking at the display unit; and
controlling a focus of the image pickup unit to focus on an object displayed at a position based on the detected line-of-sight, wherein
in a case where a motion vector of a first object displayed at the position based on the line-of-sight matches a motion vector of the position based on the line-of-sight, the focus of the image pickup unit is controlled to focus on the first object, and
in a case where the motion vector of the first object displayed at the position based on the line-of-sight does not match the motion vector of the position based on the line-of-sight, the focus of the image pickup unit is not controlled to focus on the first object.

9. An electronic device comprising:
at least one memory and at least one processor which function as:
a display control unit configured to display a picked-up image picked up by an image pickup unit, on a display unit;
a line-of-sight detection unit configured to detect a line-of-sight of a user looking at the display unit; and
a focus control unit configured to control a focus of the image pickup unit to focus on an object displayed at a position based on the line-of-sight detected by the line-of-sight detection unit,
wherein in a case where a motion vector of the position based on the line-of-sight is constant and a distance between the image pickup unit and a first object displayed at the position based on the line-of-sight changes more than a predetermined value, the focus control unit does not control the focus of the image pickup unit to focus on the first object.

10. The electronic device according to claim 9, wherein
in a case where the distance between the image pickup unit and the first object does not change from the distance after the change more than the predetermined value, the focus control unit controls the focus of the image pickup unit to fix the focus of the image pickup unit to a position of the focus of the image pickup unit set before the change more than the predetermined value, and
in a case where the distance between the image pickup unit and the first object changes from the distance after the change more than the predetermined value, the focus control unit controls the focus of the image pickup unit to focus on the first object.

11. The electronic device according to claim 9, wherein
in a case where the motion vector of the position based on the line-of-sight changes more than the predetermined value and the distance between the image pickup unit and the first object does not change more than a predetermined value, the focus control unit controls the focus of the image pickup unit to focus on a second object different from the first object.

12. A control method of an electronic device, comprising:
displaying a picked-up image picked up by an image pickup unit, on a display unit;
detecting a line-of-sight of a user looking at the display unit; and
controlling a focus of the image pickup unit to focus on an object displayed at a position based on the detected line-of-sight,
wherein in a case where a motion vector of the position based on the line-of-sight is constant and a distance between the image pickup unit and a first object displayed at the position based on the line-of-sight changes more than a predetermined value, the focus of the image pickup unit is not controlled to focus on the first object.

13. A non-transitory computer readable medium that stores a program, wherein the program causes a computer to execute a control method of an electronic device, the control method comprising:
displaying a picked-up image picked up by an image pickup unit, on a display unit;
detecting a line-of-sight of a user looking at the display unit; and
controlling a focus of the image pickup unit to focus on an object displayed at a position based on the detected line-of-sight,
wherein in a case where a motion vector of the position based on the line-of-sight is constant and a distance between the image pickup unit and a first object displayed at the position based on the line-of-sight changes more than a predetermined value, the focus of the image pickup unit is not controlled to focus on the first object.

14. An image pickup control device, comprising:
at least one memory and at least one processor which function as:
a first obtaining unit configured to obtain a picked-up image picked up by an image pickup unit;
a display control unit configured to display the picked-up image on a display unit;
a detection unit configured to detect a viewpoint region which is a region viewed by a user in the display unit;
a second obtaining unit configured to obtain a feature amount relating to the picked-up image; and
a control unit configured to control a focus of the image pickup unit to focus on an object displayed on the viewpoint region, wherein
the control unit switches whether or not to control the focus of the image pickup unit to focus on the object displayed on the viewpoint region, on a basis of the viewpoint region and the feature amount.

* * * * *